(12) United States Patent
Kan et al.

(10) Patent No.: US 7,051,025 B2
(45) Date of Patent: May 23, 2006

(54) METHOD AND SYSTEM FOR DISPLAYING MULTIDIMENSIONAL AGGREGATE PATTERNS IN A DATABASE SYSTEM

(75) Inventors: Masataka Kan, Yokohama (JP); Morihiro Iwata, Tama (JP); Nobuyuki Yamashita, Yokohama (JP); Yuuji Hirose, Miura (JP)

(73) Assignee: Hitachi, Ltd., Tokyo (JP)

( * ) Notice: Subject to any disclaimer, the term of this patent is extended or adjusted under 35 U.S.C. 154(b) by 23 days.

(21) Appl. No.: 10/819,185

(22) Filed: Apr. 7, 2004

(65) Prior Publication Data

US 2004/0193598 A1 Sep. 30, 2004

Related U.S. Application Data

(63) Continuation of application No. 09/653,456, filed on Aug. 31, 2000, now abandoned.

(30) Foreign Application Priority Data

Jun. 30, 2000 (JP) .............................. 2000-203064

(51) Int. Cl.
*G06F 17/30* (2006.01)
(52) U.S. Cl. ...................... 707/6; 707/102; 707/104.1
(58) Field of Classification Search ............ 707/1–102, 707/104.1; 345/834, 837
See application file for complete search history.

(56) References Cited

U.S. PATENT DOCUMENTS

| | | | |
|---|---|---|---|
| 6,167,396 A | 12/2000 | Lokken | |
| 6,212,515 B1 | 4/2001 | Rogers | |
| 6,301,579 B1 | 10/2001 | Becker | |
| 6,362,823 B1 | 3/2002 | Johnson et al. | |
| 6,392,667 B1 | 5/2002 | McKinnon et al. | |
| 6,434,544 B1 | 8/2002 | Bakalash et al. | |
| 6,535,872 B1 * | 3/2003 | Castelli et al. | 707/3 |
| 6,556,225 B1 | 4/2003 | MacPhail | |
| 6,581,068 B1 | 6/2003 | Bensoussan et al. | |
| 6,625,611 B1 * | 9/2003 | Teig et al. | 707/102 |
| 6,701,306 B1 * | 3/2004 | Kronmiller et al. | 707/2 |
| 6,750,864 B1 * | 6/2004 | Anwar | 345/440 |
| 6,877,013 B1 * | 4/2005 | Kronmiller et al. | 707/102 |
| 2003/0071814 A1 * | 4/2003 | Jou et al. | 345/440 |

OTHER PUBLICATIONS

The OLAP Report "Succeeding with On-Line Analytical Processing", 1995, vol. 1, pp. 69-77.

* cited by examiner

*Primary Examiner*—Debbie M. Le
(74) *Attorney, Agent, or Firm*—Mattingly, Stanger, Malur & Brundidge, P.C.

(57) ABSTRACT

In display processing and input processing of multidimensional aggregate patterns, a graph including coordinate axes for displaying aggregation levels of respective dimensions is used. An aggregate pattern of each aggregate cube is displayed as a figure on the graph. By using position relations on the graph, the relation between pre-aggregate data and aggregated data is visualized. On the basis of the position relations on the graph, the user can select a pre-aggregate cube.

12 Claims, 31 Drawing Sheets

FIG. 2

| TIME DIMENSION | COMMODITY DIMENSION | SELLING AGENCY DIMENSION | REGION DIMENSION | CUSTOMER DIMENSION |
|---|---|---|---|---|
| YEAR | | WHOLE COMPANY | | |
| QUARTER OF THE YEAR | TOTAL | BRANCH OFFICE | WHOLE COUNTRY | ALL CUSTOMERS |
| MONTH | MAKER | BRANCH | DISTRICT | TYPE OF INDUSTRY |
| WEEK | CLASSIFICATION | SECTION | URBAN OR RURAL PREFECTURE | |
| DAY | COMMODITY NAME | PERSON IN CHARGE | CITY, TOWN OR VILLAGE | CUSTOMER NAME |

FIG. 5

| AGGREGATE PATTERN | | | | | NUMBER OF CELLS | TOTAL DATA SIZE | EXPECTED AGGREGATE PROCESSING TIME |
|---|---|---|---|---|---|---|---|
| TIME DIMENSION | COMMODITY DIMENSION | SELLING AGENCY DIMENSION | REGION DIMENSION | CUSTOMER DIMENSION | | | |
| YEAR | TOTAL | WHOLE COMPANY | WHOLE COUNTRY | ALL CUSTOMERS | 1 | 0.01 KB | 18 SEC |
| YEAR | TOTAL | WHOLE COMPANY | WHOLE COUNTRY | TYPE OF INDUSTRY | 3 | 0.03 KB | 14 SEC |
| YEAR | TOTAL | WHOLE COMPANY | WHOLE COUNTRY | CUSTOMER NAME | 50 | 0.5 KB | 5 SEC |
| MONTH | MAKER | SECTION | URBAN OR RURAL PREFECTURE | TYPE OF INDUSTRY | 33840 | 338.4 KB | 67 SEC |
| MONTH | CLASSIFICATION | BRANCH | URBAN OR RURAL PREFECTURE | ALL CUSTOMERS | 11280 | 112.8 KB | 71 SEC |
| MONTH | CLASSIFICATION | SECTION | URBAN OR RURAL PREFECTURE | TYPE OF INDUSTRY | 42300 | 423 KB | 23 SEC |
| WEEK | COMMODITY NAME | SECTION | CITY, TOWN OR VILLAGE | CUSTOMER NAME | 122200000 | 1193 MB | 5 SEC |

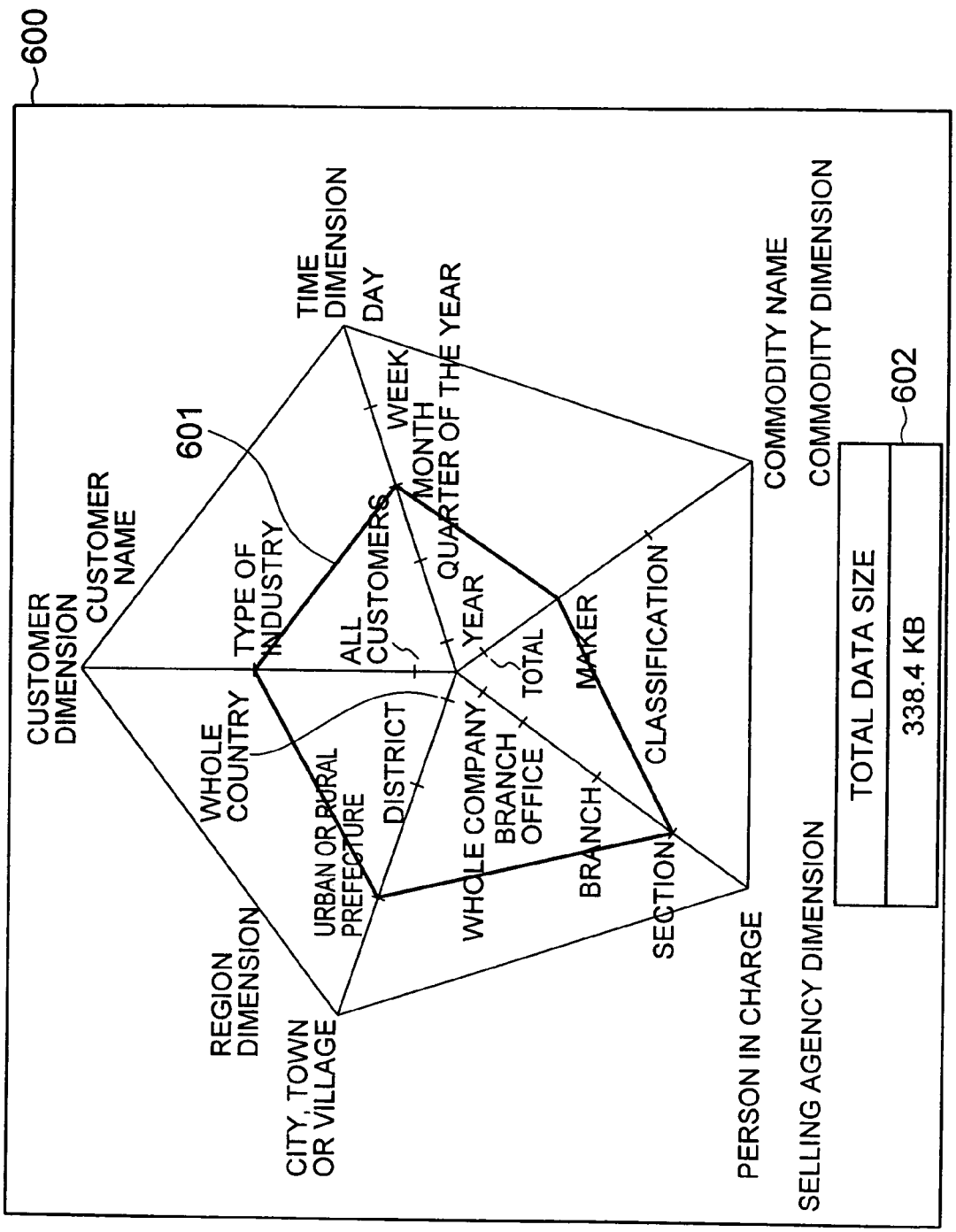

- 900 MULTIDIMENSIONAL DATA BASE
- 901 MULTIDIMENSIONAL DATA STORAGE SECTION
- 902 DIMENSION INFORMATION TABLE
- 903 HIERARCHY INFORMATION TABLE

1000

| DIMENSION NAME | NUMBER OF AGGREGATION LEVELS |
|---|---|
| TIME DIMENSION | 5 |
| COMMODITY DIMENSION | 4 |
| SELLING AGENCY DIMENSION | 5 |
| REGION DIMENSION | 4 |
| CUSTOMER DIMENSION | 3 |

FIG. 11

| DIMENSION NAME | NUMBER OF LEVELS |
|---|---|
| SELLING AGENCY DIMENSION | 5 |

1101

1100

| AGGREGATE LEVEL | MEMBER | PARENT MEMBER |
|---|---|---|
| WHOLE COMPANY | WHOLE COMPANY | — |
| BRANCH OFFICE | TOKYO BRANCH OFFICE | WHOLE COMPANY |
| BRANCH OFFICE | OSAKA BRANCH OFFICE | WHOLE COMPANY |
| BRANCH | TOKYO BRANCH | TOKYO BRANCH OFFICE |
| BRANCH | YOKOHAMA BRANCH | TOKYO BRANCH OFFICE |
| BRANCH | OSAKA BRANCH | OSAKA BRANCH OFFICE |
| BRANCH | KOBE BRANCH | OSAKA BRANCH OFFICE |
| SECTION | TOKYO SALES FIRST SECTION | TOKYO BRANCH |
| SECTION | TOKYO SALES SECOND SECTION | TOKYO BRANCH |
| SECTION | YOKOHAMA SALES SECTION | YOKOHAMA BRANCH |
| SECTION | OSAKA SALES SECTION | OSAKA BRANCH |
| SECTION | KOBE SALES SECTION | KOBE BRANCH |
| PERSON IN CHARGE | SUZUKI | TOKYO SALES FIRST SECTION |
| PERSON IN CHARGE | SATO | TOKYO SALES FIRST SECTION |
| PERSON IN CHARGE | TANAKA | TOKYO SALES SECOND SECTION |

| TIME DIMENSION | COMMODITY DIMENSION | SELLING AGENCY DIMENSION | REGION DIMENSION | CUSTOMER DIMENSION |
|---|---|---|---|---|
| YEAR | TOTAL | WHOLE COMPANY | WHOLE COUNTRY | CUSTOMER NAME |
| QUARTER OF THE YEAR | CLASSIFICATION | BRANCH | DISTRICT | TYPE OF INDUSTRY |
| MONTH | TOTAL | BRANCH OFFICE | DISTRICT | TYPE OF INDUSTRY |
| MONTH | MAKER | SECTION | DISTRICT | ALL CUSTOMERS |
| WEEK | COMMODITY NAME | SECTION | CITY, TOWN OR VILLAGE | CUSTOMER NAME |

| ITEM / TABLE | 01 | 02 | 03 | 04 | 05 |
|---|---|---|---|---|---|
| BRANCH OFFICE | ○ | ○ | | | |
| BRANCH | ○ | | ○ | | |
| SECTION | ○ | ○ | ○ | | |
| PERSON IN CHARGE | ○ | | | | |
| SALES | ○ | ○ | ○ | | |

3200

METHOD AND SYSTEM FOR DISPLAYING MULTIDIMENSIONAL AGGREGATE PATTERNS IN A DATABASE SYSTEM

This application is a continuation of U.S. patent application Ser. No. 09/653,456, filed Aug. 31, 2000, now abandoned which is incorporated by reference herein in its entirety.

BACKGROUND OF THE INVENTION

The present invention relates to a display technique of data managed in a database management system.

As a typical technique for faster data aggregation processing in a multidimensional database management system, there is pre-aggregation. The pre-aggregation is a method of finishing aggregation calculation when reading data into a database and preserving the result (Pendse, N., and Creeth, R. F., *The OLAP Report*, pp. 69–77, Business Intelligence, 1995). Upon receiving an aggregation request, it is sufficient to only read out an aggregating value previously calculated.

However, it is known that the total amount of aggregate data obtained by aggregating multidimensional material data in various ways cause combinational burst with an increase of dimension or an increase of dimension hierarchy (the aforementioned paper). It becomes impossible in a large scale database to previously aggregate all considerable aggregate data.

In order to cope with this problem, there is proposed such a method of previously creating and storing only aggregating values of an aggregate pattern specified by the user (JP-A-8-329101). Because it is possible to reduce the total amount of stored aggregate data while increasing the speed of aggregation processing of an aggregate pattern requested by the user.

Here, the aggregate pattern is a combination of aggregation levels of respective dimensions. Furthermore, an aggregation level is a level to which a member corresponding to an aggregation value in the aggregation hierarchy of each dimension.

As an aggregate pattern specifying method of pre-aggregation of a conventional multidimensional database management system, a method of inputting an aggregation level of each dimension for each specified aggregate pattern is typical. For example, in an example shown in JP-A-8-329101, an aggregate pattern is made to be specified by using a table having a form shown in FIG. 32.

A table 3200 of FIG. 32 is a table for making a user specify index items used to create an aggregate data table. In a leftmost column, items which can be specified are displayed. A second column and subsequent columns correspond to aggregate tables to be created. Numerals of the top row of the table 3200 indicate identification numbers of aggregate data tables.

When specifying aggregate tables to be created, pertinent index items are selected. In a column corresponding to a table, "a" is displayed on specified items. For example, in "02," aggregate data of the sales are created in items of a branch office and a section. By using this method, aggregation processing of items requested by the user is previously conducted.

SUMMARY OF THE INVENTION

If pre-aggregation is executed with regard to some aggregate patterns, then the response time for aggregate query can also be shortened in some cases with regard to aggregate patterns which are not aggregated previously.

For example, if an aggregation level of a certain aggregate pattern is higher as regards all dimensions than the aggregation level of a different aggregate pattern, then the aggregate data of the former aggregate pattern can be calculated from the aggregate data of the latter aggregate pattern. At this time, if the response time for aggregate query of the former aggregate pattern is sufficiently short, then it is not necessary to conduct pre-aggregation for the former aggregate pattern. If pre-aggregate cubes can thus be reduced even by one, the total amount of aggregate data and creation time can be reduced.

Hereafter, data used for aggregation calculation of a higher level are referred to as source of aggregation. Furthermore, an aggregate pattern of source of aggregation is referred to as source cube pattern. If a source cube pattern does not exist in the pre-aggregated aggregate patterns, material data are used as source of aggregation.

On the other hand, there is a possibility that a plurality of sources of aggregation exist in aggregation processing of one aggregate pattern. Because all of such pre-aggregate cube data that the aggregation level of every dimension is lower than the aggregation level of the aggregate pattern of aggregation destination can become the source of aggregation.

In such a case, the response time for aggregate query becomes shorter by selecting an aggregate pattern having the least number of data as the source cube pattern. Because the processing cost at the time when executing the aggregation increases with the number of data of the source of aggregation.

Because of the facts heretofore described, it is possible to use pre-aggregate data as the source of aggregation and improve the aggregation processing performance of more aggregate patterns, by determining the pre-aggregate cube with due regard to the relations between the aggregate pattern of the aggregate cube and the source cube pattern and the number of data of the source of aggregation.

In the conventional pre-aggregate cube specifying method, it cannot be conducted efficiently to narrow down the pre-aggregate cubes with due regard to relations of aggregate pattern. For example, in the method using the table 3200 exemplified in JP-A-8-329101, selection is conducted by entering "a" in items corresponding to aggregate patterns in a table having aggregation levels of respective dimensions arranged therein. In this method, it is necessary to compare respective aggregation levels in aggregation hierarchy of each dimension, in order to compare a plurality of aggregate patterns. Since comparison is effected individually for each dimension, therefore, it takes time to effect combination comparison. Furthermore, as the number of dimensions and the number of aggregation levels increase, comparison items increase and aggregate pattern comparison becomes further difficult.

An object of the present invention is to provide a data display method, and system, for displaying multi-dimensional aggregate pattern to assist the work of narrowing pre-aggregate cubes.

In the present invention, the above described object is achieved by a data display method for displaying aggregate patterns in a database management system for storing data of a plurality of dimensions and processing aggregation requests concerning the data, the data display method including the steps of: displaying coordinate axes respectively representing aggregation levels of the dimensions; determining an order of arranging graduations on the coordinate axes to be either an ascending order or descending order of displayed aggregation levels; arranging and displaying graduations on corresponding one of the coordinate axes for each of the dimensions in accordance with the arranging order; presetting graduations corresponding to aggregation levels of aggregate patterns to be displayed, on each of the coordinate axes corresponding to each dimension; and displaying the preset graduations so as to associate the preset graduations with each other. By doing so, multidimensional aggregate patterns can be displayed. Accordingly, it becomes possible to assist the work of narrowing down pre-aggregate cubes.

BRIEF DESCRIPTION OF THE DRAWINGS

FIG. 2 is a diagram showing the configuration of aggregation levels of respective dimensions, of multidimensional data to be used as an example in description of an embodiment;

FIG. 5 is a diagram showing an example of an aggregate pattern information table;

FIG. 6 is a diagram showing a display example of aggregate pattern information;

FIG. 11 is a diagram showing an example of a hierarchy information table;

FIG. 15 is a diagram showing an example of a pre-aggregate cube list table;

FIG. 32 is a diagram showing a display example of a pre-aggregate item specifying screen of a conventional technique.

DESCRIPTION OF THE EMBODIMENTS

The principle of the present invention will now be described.

Figure 1:
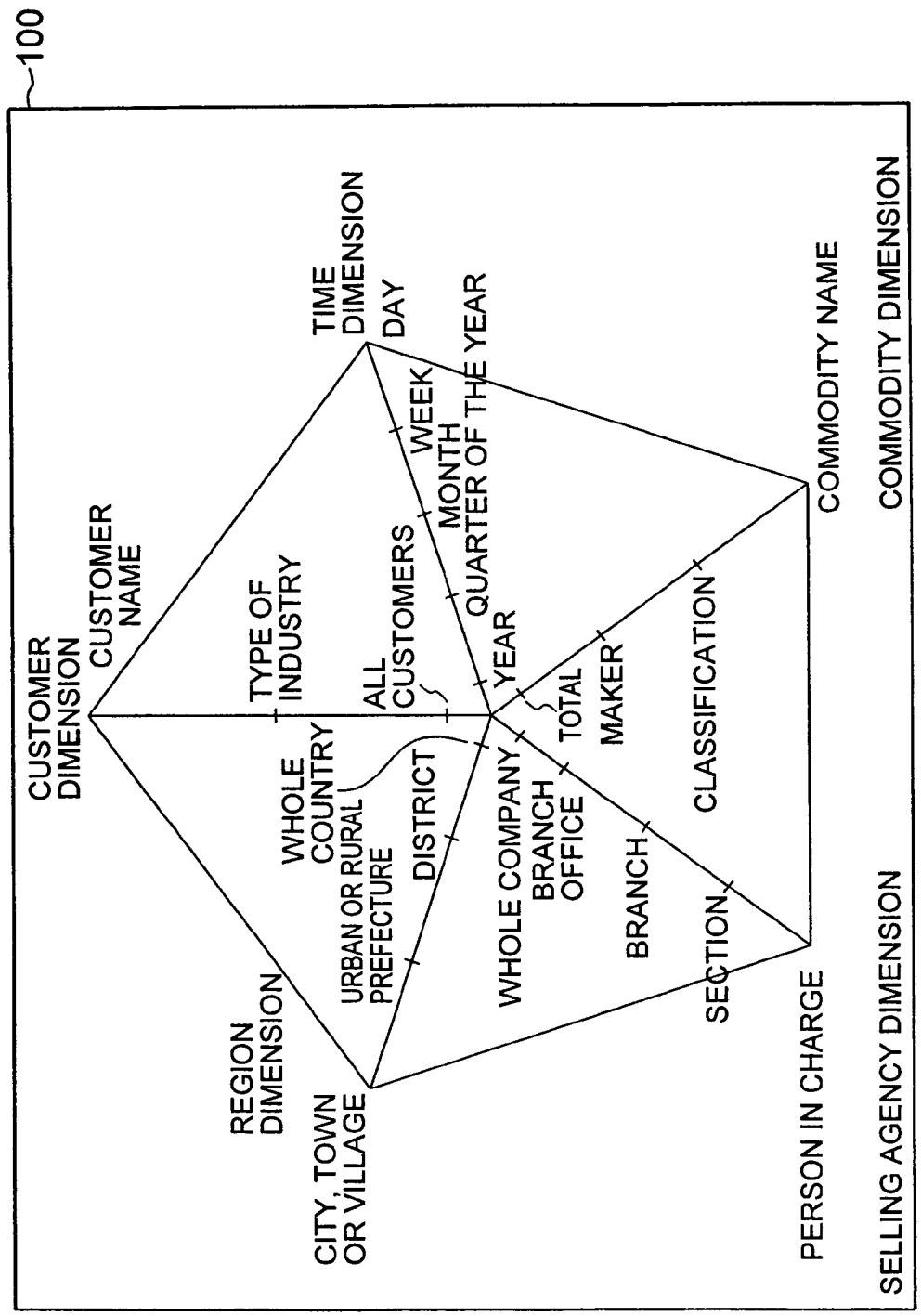
FIG. 1 is a diagram showing an example of radial coordinate axes which is an embodiment of coordinate axes for displaying multidimensional aggregate patterns.

In displaying and inputting a multidimensional aggregate pattern, a graph displayed on the screen is used. On the graph, as many axes as the number of dimensions of the multidimensional aggregate pattern are displayed. Displayed coordinate axes are associated with dimensions in a one-to-one correspondence. On each coordinate axis, graduations showing aggregate levels of a dimension corresponding to the coordinate axis are indicated. At this time, the graduation disposition order of all coordinate axes are unified to the ascending order or descending order of the corresponding aggregation levels. An example of the above described graph is shown in FIG. 1.

In the display of the multidimensional aggregate pattern, graduations corresponding to aggregation levels of the aggregate pattern are specified every coordinate axis corresponding to each dimension, and graduations specified as regards the same aggregate pattern are displayed in association. Since the position relations on the coordinate axes correspond to up-and-down relations, relations among a plurality of aggregate patterns can be displayed by position relations of the figures.

Furthermore, on the basis of the number of members belonging to a corresponding aggregate level on a coordinate axis of the above described graph, positions of respective graduations are determined. As a result, the aggregation processing cost in the case where each aggregate pattern is handled as a source cube can be compared by means of figure intervals. Because the aggregation processing cost increases with the product of the numbers of members belonging to aggregation levels of the source cube pattern.

In a system including a table having information of respective aggregate patterns recorded therein, the user selects an aggregate pattern displayed on the screen. In response thereto, information of the aggregate pattern acquired from the table or information derived from the acquired information is displayed on the screen. As regards the selected aggregate pattern, relations to other aggregate patterns and characteristics of the aggregate pattern can be ascertained on the same screen.

Furthermore, by altering in the above described system the colors or shapes of lines of displayed figures according to information of respective aggregate patterns, relations to other aggregate patterns and the aggregation characteristic of the aggregate pattern can be visually ascertained as regards a plurality of aggregate patterns.

In a system including a device for inputting selected aggregate patterns, an aggregate pattern serving as a source cube in aggregation processing is found as regards an aggregate pattern selected by the user, and a figure corresponding to the aggregate pattern is displayed. By simultaneously displaying an aggregate pattern and its source cube pattern on a graph, a difference in aggregation level between the selected aggregate pattern and its source cube pattern can be ascertained on the basis of position relations of figures.

In a system including a device for inputting a condition and a table for storing information of aggregate patterns, aggregate patterns to be tuned can be narrowed down by selecting patterns meeting the condition specified by the user from among all aggregate patterns and displaying the selected patterns on a graph.

Furthermore, by excluding aggregate patterns specified as being beside the subject of aggregation processing by the user, from aggregate candidates, tuning according to the user can be effected.

In inputting a multidimensional aggregate pattern, the user selects graduations on coordinates axes of the display screen. In response thereto, a combination of corresponding aggregation levels is inputted to the system. By specifying an aggregate pattern on the graph, an aggregate pattern can be selected by ascertaining the relations to other aggregate patterns.

Furthermore, by displaying an inputted aggregate pattern on the screen, relations among the selected aggregate patterns can be visualized.

Hereafter, embodiments of the present invention will be described.

In the present invention, relations among a plurality of aggregate patterns are visualized by displaying a multidimensional aggregate pattern by using a graph. Each aggregate pattern is displayed as a figure on the graph. By position relations of figures, relations among a plurality of aggregate patterns are displayed.

The above described graph has as many coordinate axes as the number of dimensions in order to display aggregation levels of respective dimensions. The coordinate axes correspond to dimensions of the multidimensional aggregate pattern in a one-to-one correspondence. At this time, as regards all coordinate axes, the disposition order of graduations is unified to either an ascending order or a descending order of corresponding aggregation levels.

A display example of the above described graph is shown in FIG. 1. Multidimensional data used as an example includes five dimensions: time dimension, commodity dimension, selling agency dimension, region dimension, and customer dimension. Hierarchy structures of respective dimensions are shown in FIG. 2. In FIG. 2, the aggregation level of each dimension is shown successively from the top in a descending order. For example, as for the aggregation levels of the time dimension, "year", "quarter of the year", "month", "week", and "day" are arranged in the descending order.

In a graph 100 of FIG. 1, five coordinate axes are displayed radially from the same center point. In each of coordinate axes, graduations representing the aggregation levels of the corresponding dimension are described. By the side of each graduation, the name of the corresponding aggregate level is described. In every coordinate axis, graduation levels corresponding to the graduations are arranged from the center toward the outside in the descending level order.

By using the above described graph, a multidimensional aggregate pattern can be displayed as a figure. First, for each of coordinate axes corresponding to respective dimensions, graduations corresponding to the aggregation levels of the displayed aggregate pattern are specified. Subsequently, a figure is displayed so as to associate the specified graduations with each other. FIG. 5 shows a display example of aggregate patterns, as regards the above described five-dimensional multidimensional data.

Figure 3:
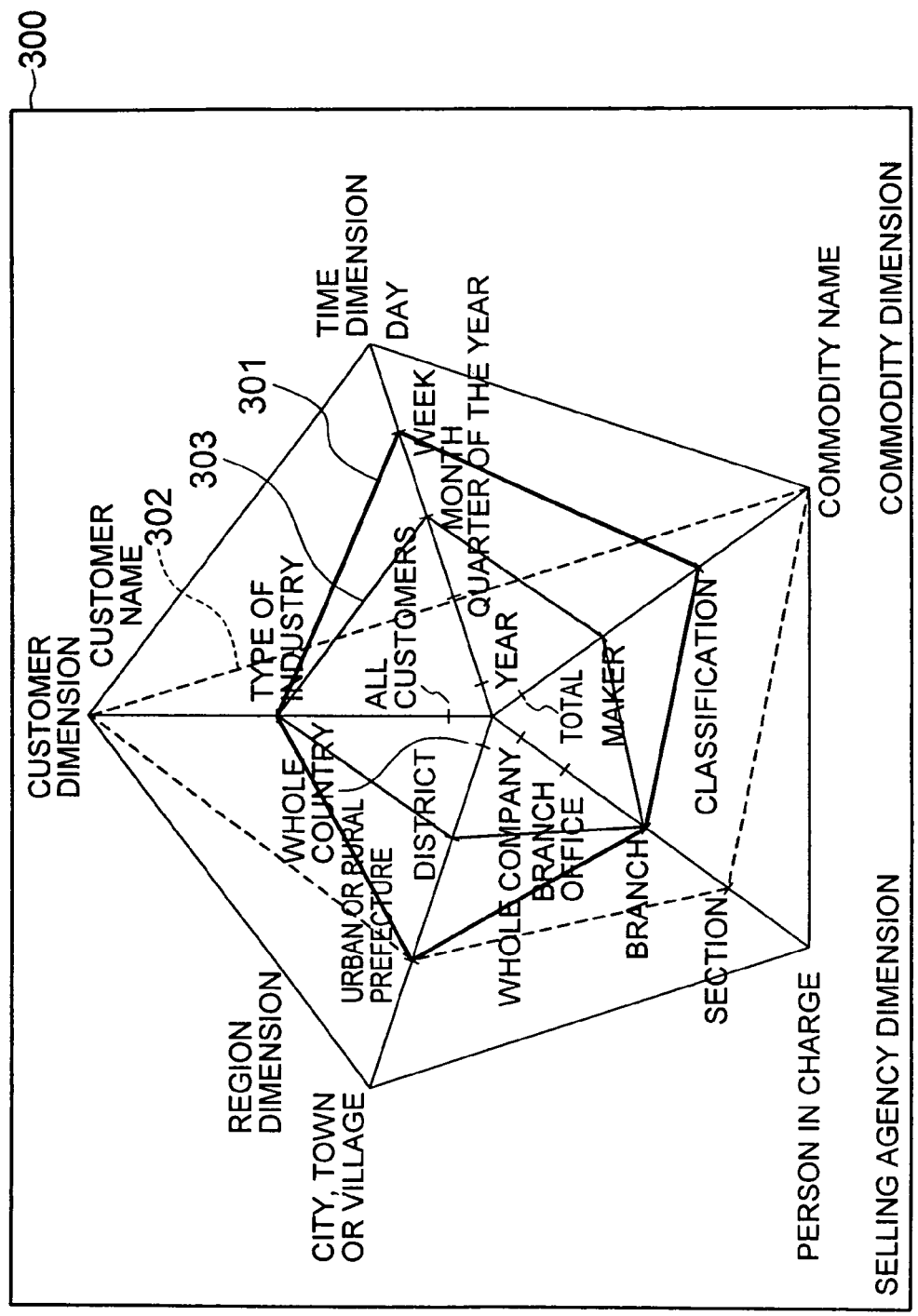
FIG. 3 is a diagram showing a display example of a multidimensional aggregate patterns using radial coordinate axes.

In FIG. 3, an aggregate pattern is displayed on a graph 300 by using a pentagon having levels corresponding to aggregation levels of respective dimensions as its vertexes. For example, a pentagon 301 represents an aggregate pattern having "week" as its aggregation level of a time dimension, "classification" as its aggregation level of a commodity dimension, "branch" as its aggregation level of a sales agency dimension, "urban or rural prefecture" as its aggregation level of a region dimension, and "type of industry" as its aggregation level of a customer dimension. A pentagon 302 represents an aggregate pattern having "quarter of the year" as its aggregation level of the time dimension, "commodity name" as its aggregation level of the commodity dimension, "section" as its aggregation level of the sales agency dimension, "urban or rural prefecture" as its aggregation level of the region dimension, and "customer name" as its aggregation level of the customer dimension. Furthermore, a pentagon 303 represents an aggregate pattern having "month" as its aggregation level of the time dimension, "maker" as its aggregation level of the commodity dimension, "branch" as its aggregation level of the sales agency dimension, "district" as its aggregation level of the region dimension, and "type of industry" as its aggregation level of the customer dimension.

Relations among a plurality of aggregate patterns are determined by up-and-down relations among aggregate patterns in each dimension. If in all dimensions the aggregation level of a certain aggregate pattern is equal in level to at least the aggregation level of a different aggregate pattern, then the aggregating value of the former aggregate pattern can be calculated from the aggregating value of the latter aggregate pattern.

In the above described graph, relations among a plurality of aggregate patterns can be judged on the basis of position relations among figures on the basis of position relations among figures on coordinate axes of the above described graph, therefore, up-and-down relations among aggregate patterns can be judged. Furthermore, in all coordinate axes, arrangement orders of graduations are unified. Without effecting comparison individually for each coordinate axis, therefore, it can be determined whether a certain aggregate pattern becomes a source cube pattern of a different aggregate pattern on the basis of position relations of the whole figures.

For example, in FIG. 3, the pentagon 303 is completely surrounded by the pentagon 301. Therefore, the aggregating value of the aggregate pattern represented by the pentagon 303 can be judged to be able to be calculated from the aggregating value of the aggregate pattern represented by the pentagon 301. Comparing the aggregating values of the pentagons 303 and 301 with each other, the aggregation level "month" of the pentagon 303 is equal to at least the aggregation level "week" of the pentagon 301 in the time dimension. In the commodity dimension, the aggregation level "maker" of the pentagon 303 is equal to at least the aggregation level "classification" of the pentagon 301. In the sales agency dimension, the aggregation level of the pentagon 303 and the aggregation level of the pentagon 301 are the same "branch". In the region dimension, the aggregation level "district" of the pentagon 303 is equal to at least the aggregation level "urban and rural prefectures" of the pentagon 301. In the customer dimension, the aggregation level of the pentagon 303 and the aggregation level of the pentagon 301 are the same "type of industry". In all dimensions, therefore, the aggregation level of the pentagon 303 is equal to at least the aggregation level of the pentagon 301. The aggregating value of the pentagon 303 can be calculated from the aggregating value of the pentagon 301 certainly.

On the other hand, since the pentagon 301 and the pentagon 302 are not in the inclusion relation, the aggregating value of one of them cannot be calculated from the aggregating value of the other of them. Actually comparing the aggregation level of the pentagon 301 with the aggregation level of the pentagon 302, the aggregation level of the aggregate pattern represented by the pentagon 301 is equal to at least the aggregation level of the aggregate pattern represented by the pentagon 302 except in the time dimension. In the time dimension, however, the aggregation level "week" of the pentagon 301 is lower than the aggregation level "quarter of the year" of the pentagon 302. Therefore, the aggregating value of the pentagon 301 cannot be derived from the aggregating value of the pentagon 302.

Furthermore, if a plurality of source cube candidates are present, then aggregation processing costs in the case where respective candidates are used can be compared with each other in the above described graph. The processing costs are compared by judging a difference in aggregation level on the basis of intervals on coordinate axes of the above described graph. In general, as the difference between the aggregation level of the source cube and the aggregation level of the destination cube becomes smaller, the number of source of aggregation becomes smaller and the aggregation processing cost becomes lower. Therefore, the narrower the interval between the figure of the source cube pattern and the figure of the aggregate pattern of aggregation destination becomes, the lower the aggregation processing cost becomes.

Furthermore, if graduations of a coordinate axis are arranged in positions determined on the basis of the number of members belonging to each aggregation level, in the above described graph, then the number of members of aggregate patterns can be compared with each other, for each dimension. As a result, the comparison of the aggregation processing cost is facilitated. Because the aggregation processing cost increases with the product of the numbers of members of dimensions of the source cube pattern. A display example is shown in FIG. 4.

Figure 4:
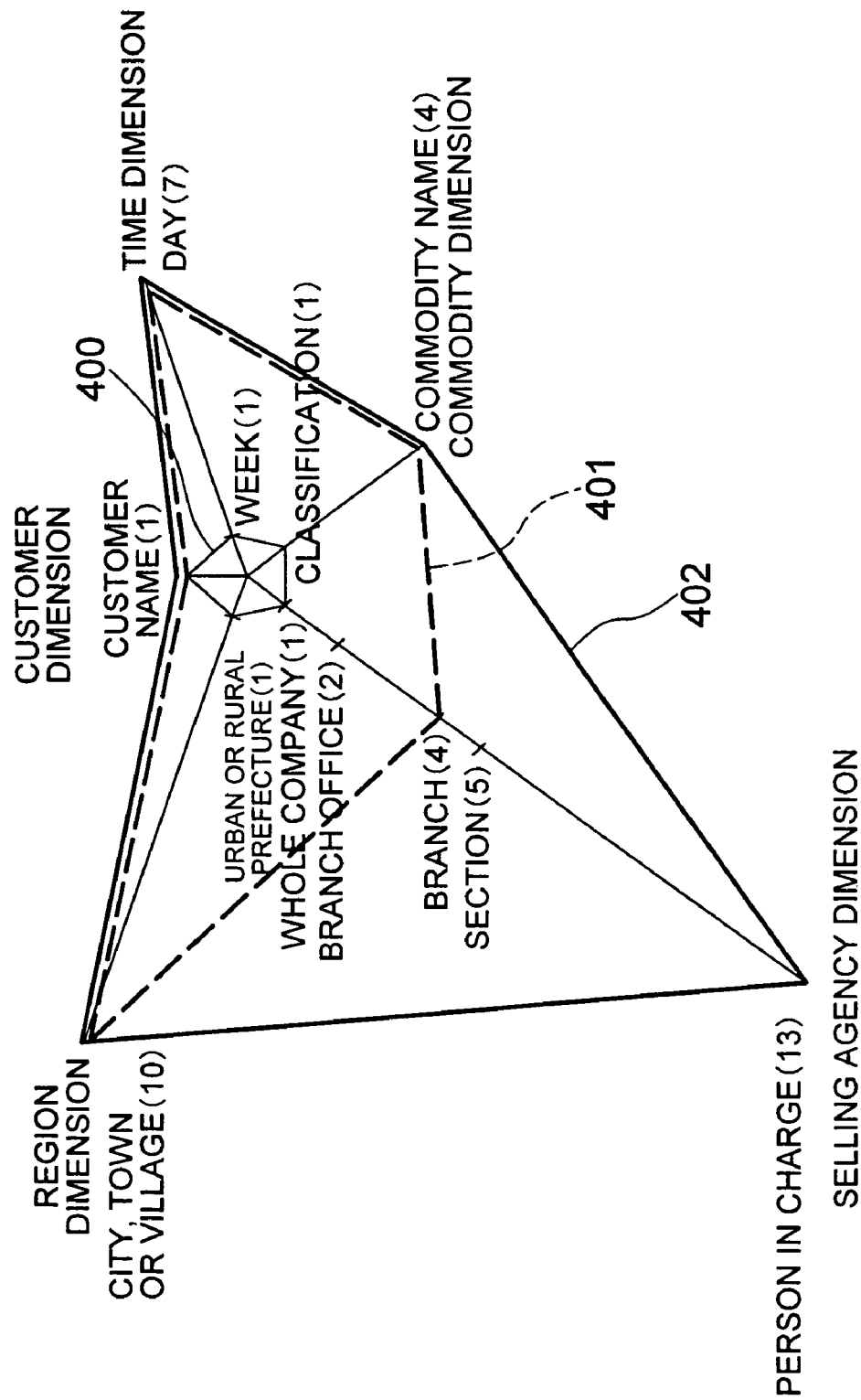
FIG. 4 is a diagram showing an example of coordinate axes in which graduation positions are determined on the basis of the number of members of each aggregation level, among radial coordination axes which is an embodiment of coordinate axes for displaying a multidimensional aggregate pattern.

In FIG. 4, the distance between a graduation and the center is proportionate to the ratio between the number of members of the aggregation level of an aggregate pattern 400 and the number of members of a corresponding aggregation level. A numeral shown beside an aggregation level and enclosed in parentheses represents the ratio between the number of members of the aggregation level of the aggregate pattern 400 and the number of members of each aggregation level. For example, in the selling agency dimension, the ratio between the number of members of a whole company level which is an aggregation level of the aggregate pattern 400 and the number of members of each aggregate level is 2 in branch office level, 4 in branch level, 5 in section level, and 13 in person in charge. Therefore, the ratios of distances of graduations corresponding to respective levels from the center are 2:4:5:13.

As an example, with aggregate pattern 401 will be compared with the aggregate pattern 402. On the selling agency dimension axis, the ratio of a distance between a graduation of the aggregate pattern 401 and the center to a distance between a graduation of the aggregate pattern 402 and the center is 4:13. All aggregation levels are the same in other dimensions. Therefore, the ratio between a processing cost required when executing the aggregation processing of the aggregate pattern 400 by using the aggregate pattern 401 as a source cube and a processing cost required when executing the aggregation processing of the aggregate pattern 400 by using the aggregate pattern 402 as a source cube becomes 4:13. In this way, the aggregation processing costs can be compared by comparing graduation positions of pentagons representing aggregate patterns on respective coordinate axes.

In a system including a table having information of aggregate patterns recorded therein, information acquired from the table or information derived from information acquired from the table, as regards an aggregate pattern selected by the user is displayed on the screen. As regards the selected aggregate pattern, therefore, relations to other aggregate patterns and the characteristic of the aggregate pattern can be ascertained on the same screen.

Hereafter, a table for storing information of aggregate patterns is referred to as aggregate pattern information table. The aggregate pattern information table is a table for recording combinations of aggregation levels of respective dimensions and detailed information of corresponding aggregate processing. The aggregate pattern information table is created by the system. FIG. 5 shows an example of the aggregate pattern information table.

With reference to FIG. 5, aggregate patterns, and the number of data, a total data size, and expected response time for aggregate query, belonging to each of aggregate patterns are registered in an aggregate pattern information table 500. Since an aggregate pattern is a combination of aggregation levels in respective dimensions, the time dimension is stored in a first column, the commodity dimension in a second column, the sales agency dimension in a third column, the region dimension in a fourth column, and the customer dimension in a fifth column. In addition, the number of data (cells) is stored in a sixth column, the total data size in a seventh column, and the expected response time for aggregate query in an eighth column. For example, a third row stores the number of data, total data size, and expected response time for aggregate query of an aggregate pattern having "year" as its aggregation level of the time dimension, "total" as its aggregation level of the commodity dimension, "whole company" as its aggregation level of the sales agency dimension, "whole country" as its aggregation level of the region dimension, and "customer name" as its aggregation level of the customer dimension.

The number of data belonging to aggregate patterns is a product of the numbers of members belonging to aggregation levels of respective dimensions. The total data size is a product of a size of one data and the number of data. The expected response time for query is derived from the number of data of the source cube pattern and the number of data of the pertinent aggregate pattern. Whenever the source cube pattern is changed by addition of a pre-aggregate cube, therefore, the system recalculates the expected response time for query and updates the table. FIG. 6 shows a display example.

With reference to FIG. 6, an aggregate pattern and its total data size are displayed on a graph 600. The aggregate pattern having "month" as its aggregation level of the time dimension, "maker" as its aggregation level of the commodity dimension, "section" as its aggregation level of the sales agency dimension, "urban or rural prefecture" as its aggregation level of the region dimension, and "type of industry" as its aggregation level of the customer dimension. The aggregate pattern is represented by a pentagon 601, and the total data size of the aggregate pattern is displayed in a table 602.

Figure 7:
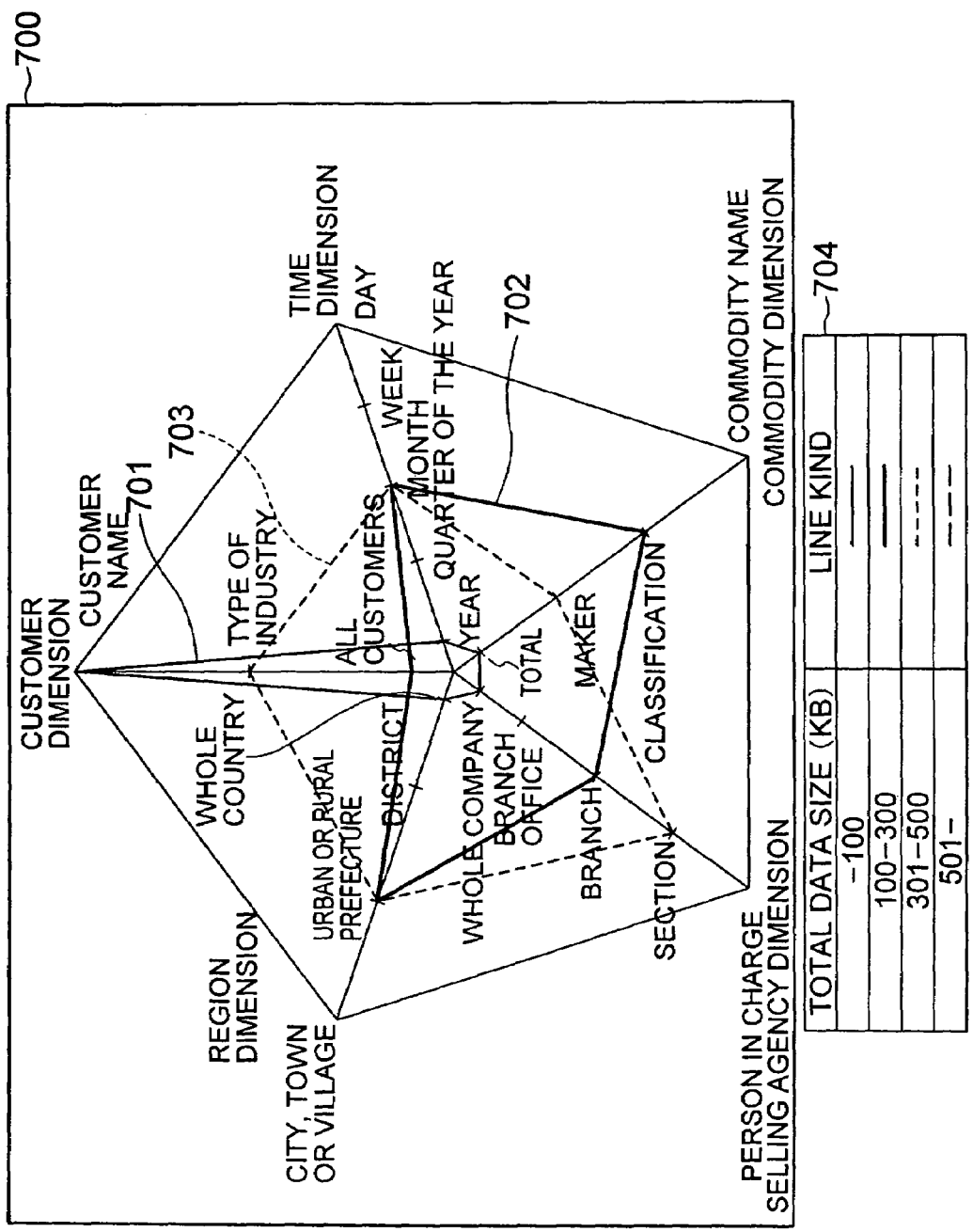
FIG. 7 is a diagram showing a display example of a graph in which line shapes are altered according to characteristics of aggregate patterns.

Furthermore, in the above described system, information concerning the aggregate pattern displayed on the screen is acquired from the aggregate pattern information table, and colors or shapes of lines of displayed figures are altered on the basis of acquired information or information derived from acquired information. As regards a plurality of aggregate patterns, therefore, relations to other aggregate patterns and characteristics of the aggregate pattern can be visually ascertained. FIG. 7 shows a display example.

FIG. 7 shows an example in which line shapes are altered according to the total data size of aggregate patterns. As shown in a table 704, lines representing an aggregate pattern having a total data size of at most 100 KB are altered to straight lines, and lines representing an aggregate pattern having a total data size between 101 KB and 300 KB are altered to thick straight lines. Lines representing an aggregate pattern having a total data size between 301 KB and 500 KB are altered to dotted lines, and lines representing an aggregate pattern having a total data size of at least 501 KB are altered to thick dotted lines. In a graph 700, therefore, it is shown that the total data size of an aggregate pattern represented by a pentagon 701 is at most 100 KB, the total data size of an aggregate pattern represented by a pentagon 702 is between 101 KB and 300 KB, and the total data size of an aggregate pattern represented by a pentagon 703 is between 301 KB and 500 KB.

Figure 8:
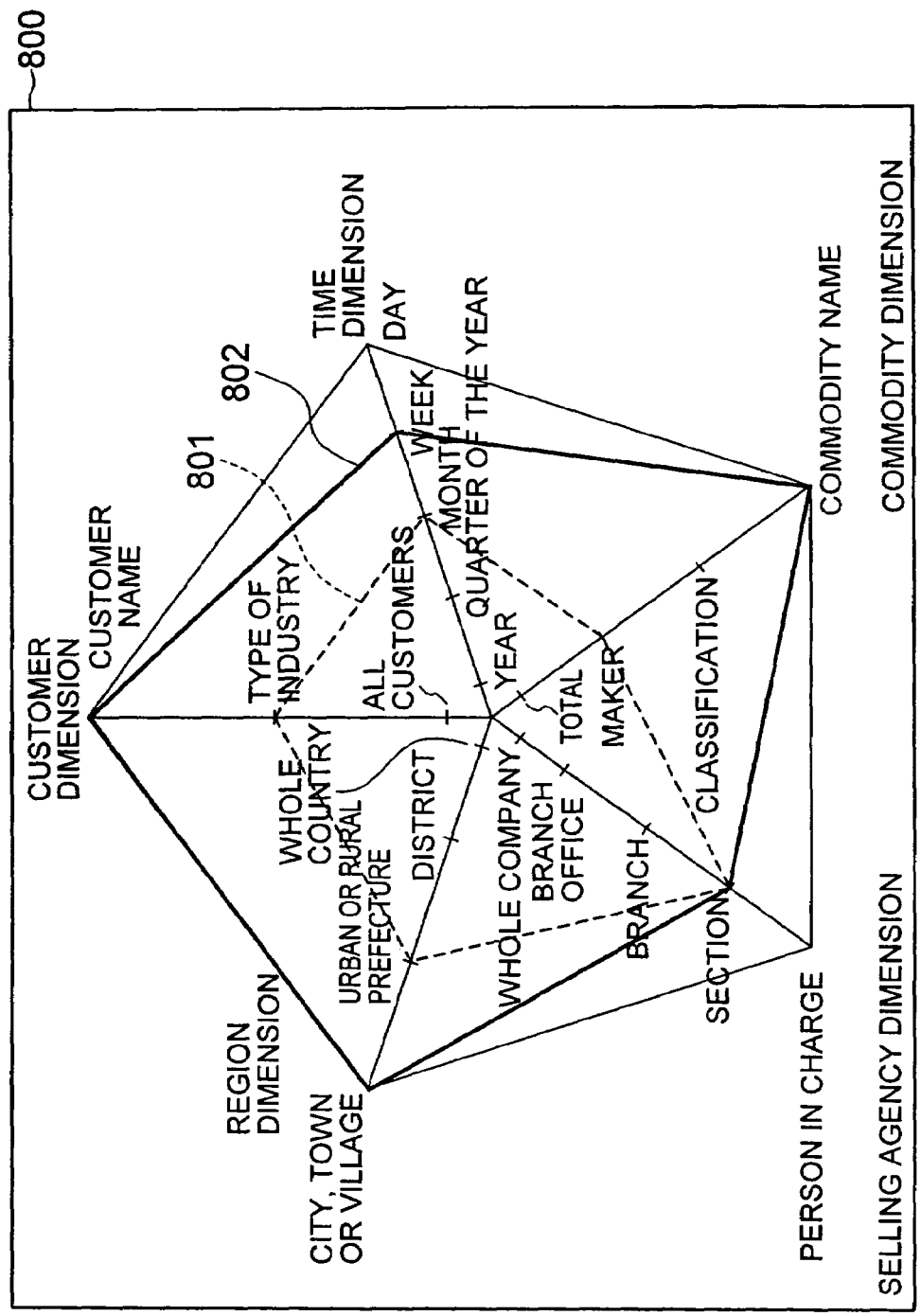
FIG. 8 is a diagram showing a source cube pattern display example of source cube pattern display processing.

In a system including a device for inputting a selected aggregate pattern, an aggregate pattern selected by the user is specified, a source cube pattern of the specified aggregate pattern is found, and a figure representing the source cube pattern is displayed on a graph. Since an aggregate pattern and its source cube pattern are displayed on the graph, the difference in aggregation level between them can be ascertained from position relations of figures. FIG. 8 shows a display example.

FIG. 8 shows a display example in the case where an aggregate pattern 801 on a graph 800 is selected and its source cube pattern is displayed. The source cube pattern of the aggregate pattern 801 has "week" as its aggregation level of the time dimension, "commodity name" as its aggregation level of the commodity dimension, "section" as its aggregation level of the sales agency dimension, "city, town, or village" as its aggregation level of the region dimension, and "customer name" as its aggregation level of the customer dimension. Therefore, a pentagon 802 is displayed on the graph. By comparing the pentagon 801 with the pentagon 802, the difference in level between the source and aggregate destination can be ascertained.

In a system including a device for inputting a display condition and the aggregate pattern information table, only patterns meeting the condition specified by the user can be displayed from among all aggregate patterns. First, a display condition inputted by the user is acquired. Subsequently, information of respective aggregate patterns is acquired from the aggregate pattern information table. The condition specified by the user is compared with the acquired information. Only aggregate patterns satisfying the display condition are displayed. On the graph, only aggregate patterns meeting the condition are displayed. Therefore, aggregate patterns to be considered in selection processing of pre-aggregate cubes can be narrowed down.

Furthermore, in the above described system, aggregate patterns selected by the user can be excluded from aggregate candidates. Aggregate patterns specified by the user are stored, and excluded from display subjects at the time of display processing execution. As a result, information which is beside the subject of tuning can be deleted from the display screen.

In multidimensional aggregate pattern input processing, an aggregate pattern is inputted by using the above described graph. The user selects a graduation on each coordinate axis. In response thereto, an aggregation level of each dimension is specified. After selection has been completed for all coordinate axes, a combination of specified aggregation levels is inputted to the system as an aggregate pattern. By thus specifying an aggregate pattern on the graph, the relations between the inputted aggregate pattern and other aggregate patterns can be ascertained in the input processing.

Furthermore, the inputted aggregate pattern can be displayed on the above described graph. First, the user selects a graduation on a coordinate axis. In response thereto, an aggregate level of each dimension is specified. Subsequently, a figure is displayed so as to associate specified graduations with each other. As a result, relations between the inputted aggregate pattern and other aggregate patterns can be visualized.

Hereafter, the processing of narrowing down pre-aggregate cubes will be described by referring to FIGS. 9 to 20. In the present description, multidimensional data having the hierarchy structure shown in FIG. 2 are used as an example. The total number of aggregate patterns of the multidimensional data is a product of the numbers of aggregation levels of dimensions. In the case of the present data, the total number is 1200 patterns.

It is now assumed that the system includes a device for inputting a selected aggregate pattern and a device for inputting a display condition. In addition, it is assumed that the system includes a multidimensional database, an aggregate pattern information table, a displayed pattern list table, an information-displayed list table, a pre-aggregate cube list table, and an invalid pattern list table.

Figures 9, 10:
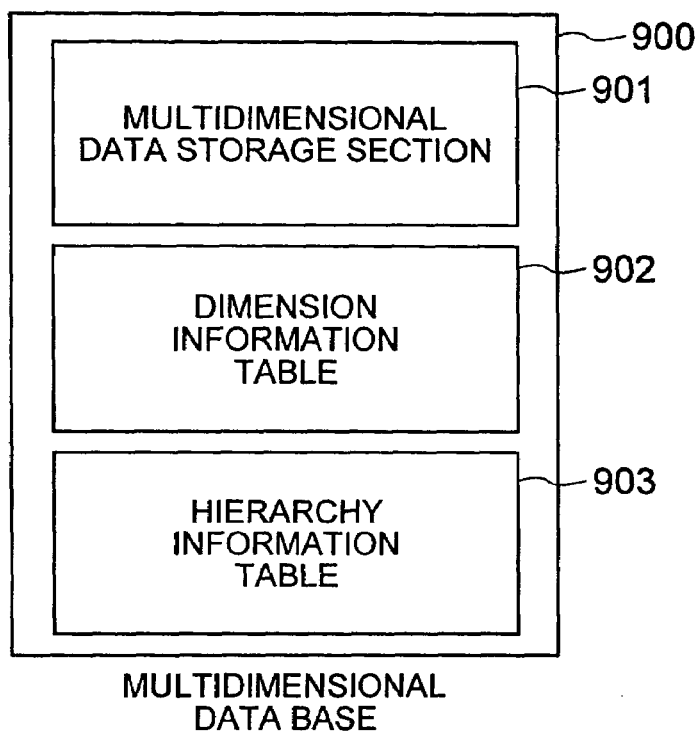
FIG. 9 is a diagram showing the configuration of a multidimensional database.
FIG. 10 is a diagram showing an example of a dimension information table.

As shown in FIG. 9, a multidimensional database includes a multidimensional data storage section 901, a dimension information table 902, and a hierarchy information table 903.

The multidimensional data storage section stores material data of multidimensional data. The material data includes a combination of members of the lowest levels of respective dimensions and a data value.

The dimension information table records information of respective dimensions. Each row corresponds to one dimension. The dimension information table includes a column for storing dimension names and a column for storing the number of aggregation levels.

FIG. 10 shows a dimension information table of multidimensional data used as an example in the present description. In a dimension information table 1000, a first column shows dimension names, and a second column shows the numbers of aggregation levels. The number of aggregation levels of each dimension is 5 for the time dimension, 4 for the commodity dimension, 5 for the sales agency dimension, 4 for the region dimension, and 3 for the customer dimension. It is now assumed that the dimension information table is in a state of the dimension information table 1000 shown in FIG. 10, at the time when starting the processing of narrowing down pre-aggregate cubes. The hierarchy information table is a table for recording hierarchy structures of respective dimensions. The hierarchy information table includes an attribute information section and a member information section. In the attribute information section, a section name and the number of aggregation levels are recorded. In the member information section, members of respective aggregate levels and parent members of respective members are recorded.

FIG. 11 shows a hierarchy information table used as an example in the present description. A hierarchy information table 1100 records a hierarchy structure of the selling agency. In the selling agency dimension, there are five levels: "whole company level", "branch office level", "branch level", "section level", "person in charge level". The selling dimension has a hierarchy structure shown in FIG. 12.

Figure 12:
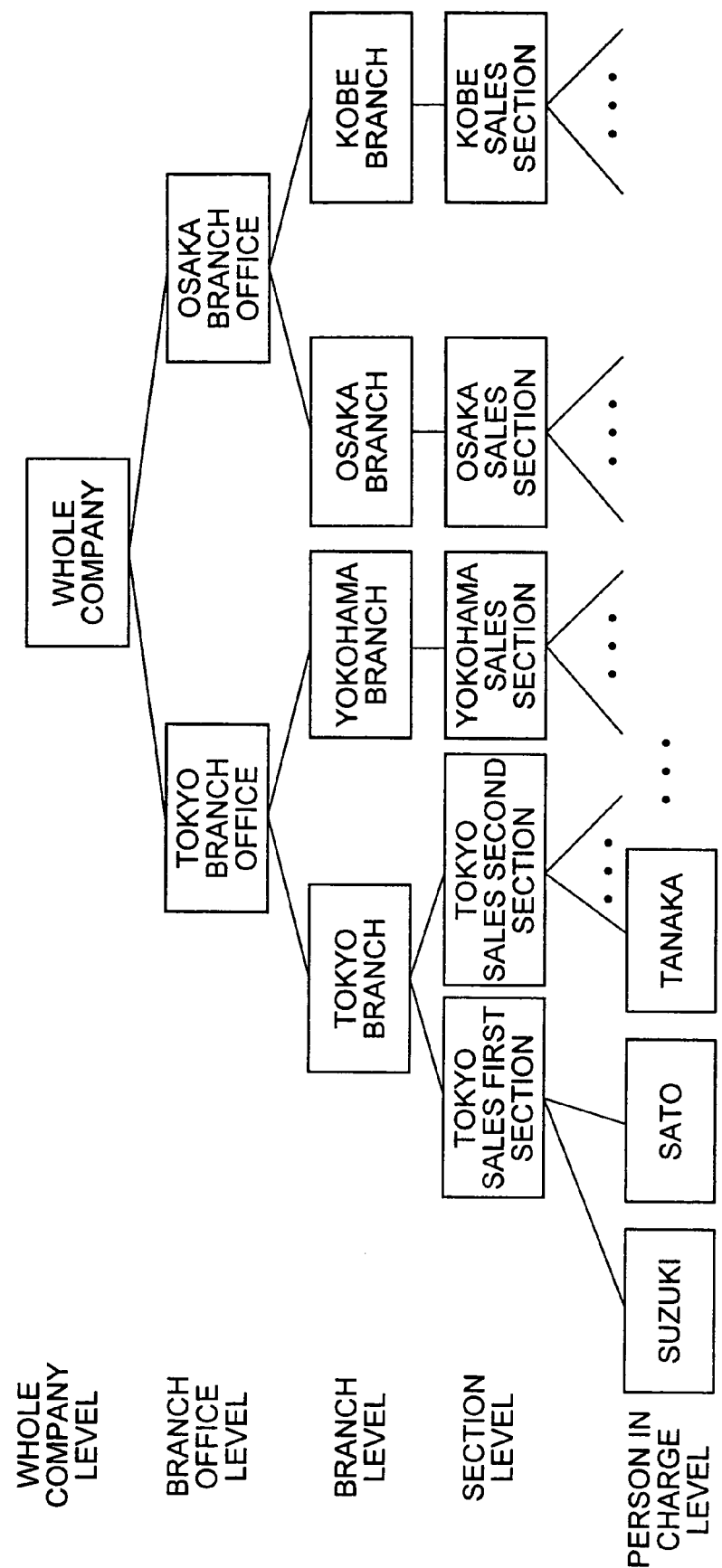
FIG. 12 is a diagram showing an aggregate hierarchy structure of a sales agency dimension of multidimensional data used as an example.

FIG. 12 is a diagram showing an aggregation hierarchy structure of the selling agency dimension. The hierarchy is shown by using a tree structure. Rectangles shown in FIG. 12 represent members of the selling agency dimension. Members coupled by a line are in a parent-child relation. An upper member is a parent, and a lower member is a child. For example, "Tokyo branch" and "Yokohama branch" are child members of "Tokyo branch office". Members shown at the same height belong to the same aggregation level. Aggregation level names of members are shown in positions having the same height as rectangles and located on the left side of the hierarchy tree. For example, both "Tokyo branch office" and "Osaka branch office" are members of a "branch office level."

As shown in FIG. 11, the hierarchy information table 1100 includes an attribute information section 1101 and a member information section 1102. In the attribute information section 1101, a dimension name and the number of aggregation levels are recorded. The dimension name is the selling agency dimension, and the number of aggregation levels is 5. In the member information section 1102, a member and its parent member are recorded for each aggregation level. One row corresponds to one member. One row includes a column for recording an aggregation level, a column for recording a member, and a column for recording a parent member. For example, a third row represents that a member "Osaka branch office" belongs to a "branch office level" and the "whole company" is its parent. It is assumed that the hierarchy information table is in the state of the hierarchy information table 1100 shown in FIG. 11 when starting the processing of narrowing down pre-aggregate cubes.

The aggregate pattern information table is a table for recording combinations of aggregation levels of respective dimensions and detailed information of corresponding aggregation processing. The aggregate pattern information table 500 of FIG. 5 is an aggregate pattern information table used as an example in the present description. It is assumed that the aggregate pattern information table is in the state of the aggregate pattern information table 500 shown in FIG. 5 when starting the processing of narrowing down pre-aggregate cubes.

The displayed pattern list table is a table for registering aggregate patterns. The registered aggregate patterns become processing subjects in the processing of displaying aggregate patterns on the graph. Each row of the table corresponds to an aggregate pattern, and an aggregation level of each dimension is stored in each column. As regards each of aggregate patterns registered in the displayed pattern list table, the system acquires aggregation levels of respective dimensions and displays a corresponding figure.

Figure 13:
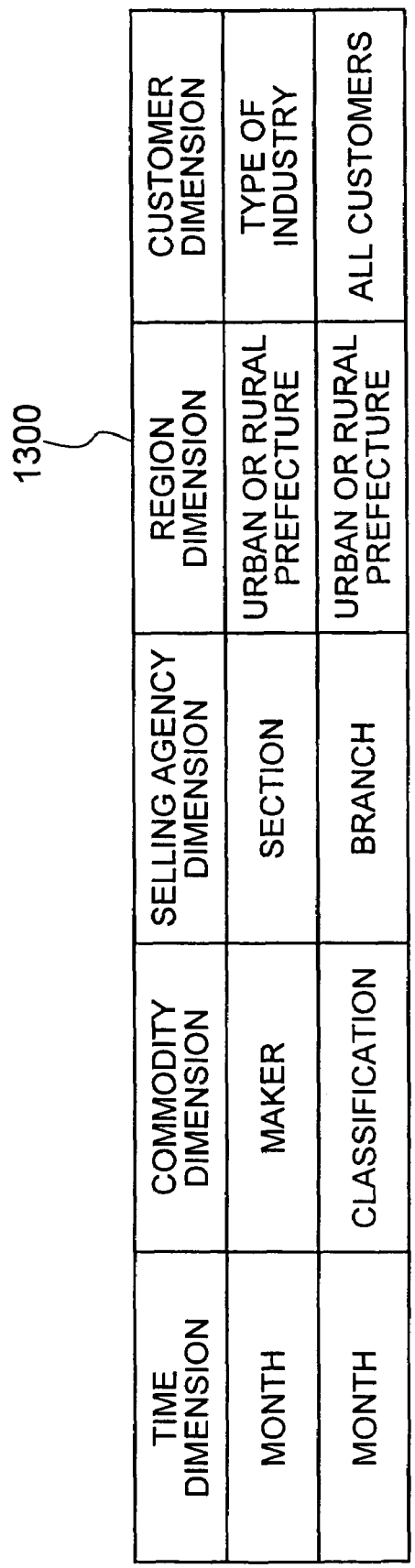
FIG. 13 is a diagram showing an example of a displayed pattern list table.

FIG. 13 shows a displayed pattern list table used as an example in the present description. Since multidimensional data used as an example is five-dimensional, one row of a displayed pattern list table 1300 includes five columns. Respective columns correspond to the time dimension, commodity dimension, selling agency dimension, region dimension, and customer dimension, respectively, and store aggregation levels of respective dimensions. In the displayed pattern list table 1300, there are registered an aggregate pattern having "month level" in the time dimension, "maker level" in the commodity dimension, "section level" in the selling agency dimension, "urban or rural prefecture level" in the region dimension, and "customer name level" in the customer dimension, and an aggregate pattern having "month level" in the time dimension, "classification level" in the commodity dimension, "branch office level" in the selling agency dimension, "urban or rural prefecture level" in the region dimension, and "all customers level" in the customer dimension. It is assumed that aggregate patterns are not registered in the displayed pattern list table when starting the processing of narrowing down pre-aggregate cubes.

The information-displayed pattern list table is a table for registering aggregate patterns. The registered aggregate pattern becomes a processing subject in processing of displaying aggregate pattern information on the screen. Each row of the table corresponds to an aggregate pattern, and an aggregation level of each dimension is stored in each column. The system acquires aggregation levels of an aggregate pattern registered in the information-displayed pattern list table, acquires corresponding aggregate pattern information from the aggregate pattern information table, and displays screen information.

Figure 14:
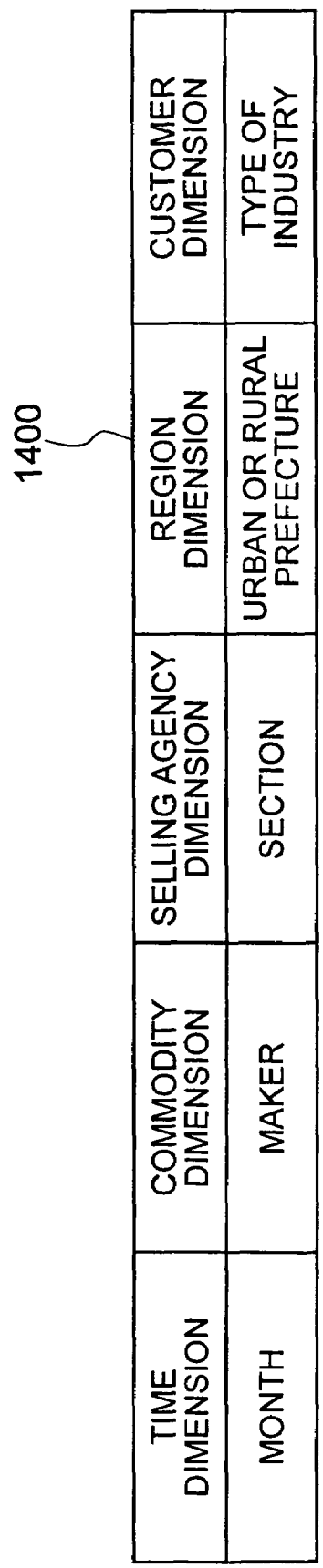
FIG. 14 is a diagram showing an example of an information-displayed pattern list table.

FIG. 14 shows the information-displayed pattern list table used as an example in the present description. Since multidimensional data used as an example is five-dimensional, one row of the information-displayed pattern list table 1400 includes five columns. Respective columns correspond to the time dimension, commodity dimension, selling agency dimension, region dimension, and customer dimension, and store aggregation levels of respective dimensions. The registered aggregate pattern has "month level" in the time dimension, "maker level" in the commodity dimension, "section level" in the selling agency dimension, "urban or rural prefecture level" in the region dimension, and "customer name level" in the customer dimension. It is assumed that aggregate patterns are not registered in the information-displayed pattern list table when starting the processing of narrowing down pre-aggregate cubes.

The pre-aggregate cube list table is a table for registering aggregate patterns serving as pre-aggregate cubes. Each row of the table corresponds to an aggregate pattern, and an aggregation level of each dimension is stored in each column. The system processes aggregate patterns registered in the pre-aggregate cube list table, as pre-aggregate cubes.

FIG. 15 shows a pre-aggregate cube list table used as an example in the present description. Since multidimensional data used as an example is five-dimensional, one row of the pre-aggregate cube list table 1500 includes five columns. Respective columns correspond to the time dimension, commodity dimension, selling agency dimension, region dimension, and customer dimension, and store aggregation levels of respective dimensions. For example, an aggregate pattern registered in the first row has "year level" in the time dimension, "total level" in the commodity dimension, "whole company level" in the selling agency dimension, "whole country level" in the region dimension, and "customer name level" in the customer dimension. It is assumed that the pre-aggregate cube list table is in the state of the pre-aggregate cube list table 1500 shown in FIG. 15 when starting the processing of narrowing down pre-aggregate cubes.

The invalid pattern list table is a table for registering aggregate patterns which become invalid in the aggregate pattern display processing. Each row of the table corresponds to an aggregate pattern, and an aggregation level of each dimension is stored in each column. The system acquires aggregation levels of an aggregate pattern registered in the invalid pattern list table, compares it with an aggregate pattern of a processing candidate, and determines whether the acquired aggregate pattern is a processing subject.

Figure 16:
FIG. 16 is a diagram showing an example of an invalid pattern list table.

FIG. 16 shows an invalid pattern list table used as an example in the present description. Since multidimensional data used as an example is five-dimensional, one row of the invalid pattern list table 1600 includes five columns. Respective columns correspond to the time dimension, commodity dimension, selling agency dimension, region dimension, and customer dimension, and store aggregation levels of respective dimensions. The registered aggregate pattern has "year level" in the time dimension, "commodity name level" in the commodity dimension, "person in charge level" in the selling agency dimension, "district level" in the region dimension, and "all customers level" in the customer dimension. It is assumed that the invalid pattern list table is in the state of the invalid pattern list table 1600 shown in FIG. 16 when starting the processing of narrowing down pre-aggregate cubes.

An object of the processing of narrowing down pre-aggregate cubes hereafter described is to make the capacity of a newly used disk at most 430 KB and make the response time for aggregate query of all aggregate patterns at most one minute. Therefore, aggregate patterns each having a response time for aggregate query of at least one minute are selected, and pre-aggregate cubes are added to increase the speed of aggregation processing of them.

In the present example, processing of narrowing down pre-aggregate cubes is conducted by using the graph 100 shown in FIG. 1. In the graph 100, coordinate axes are displayed by referring to the dimension information table 1000, and graduations ate arranged by referring to the hierarchy information table 1100. Graduations of each coordinate axis of the graph 100 are arranged in the descending order of corresponding aggregation levels.

Figure 17:
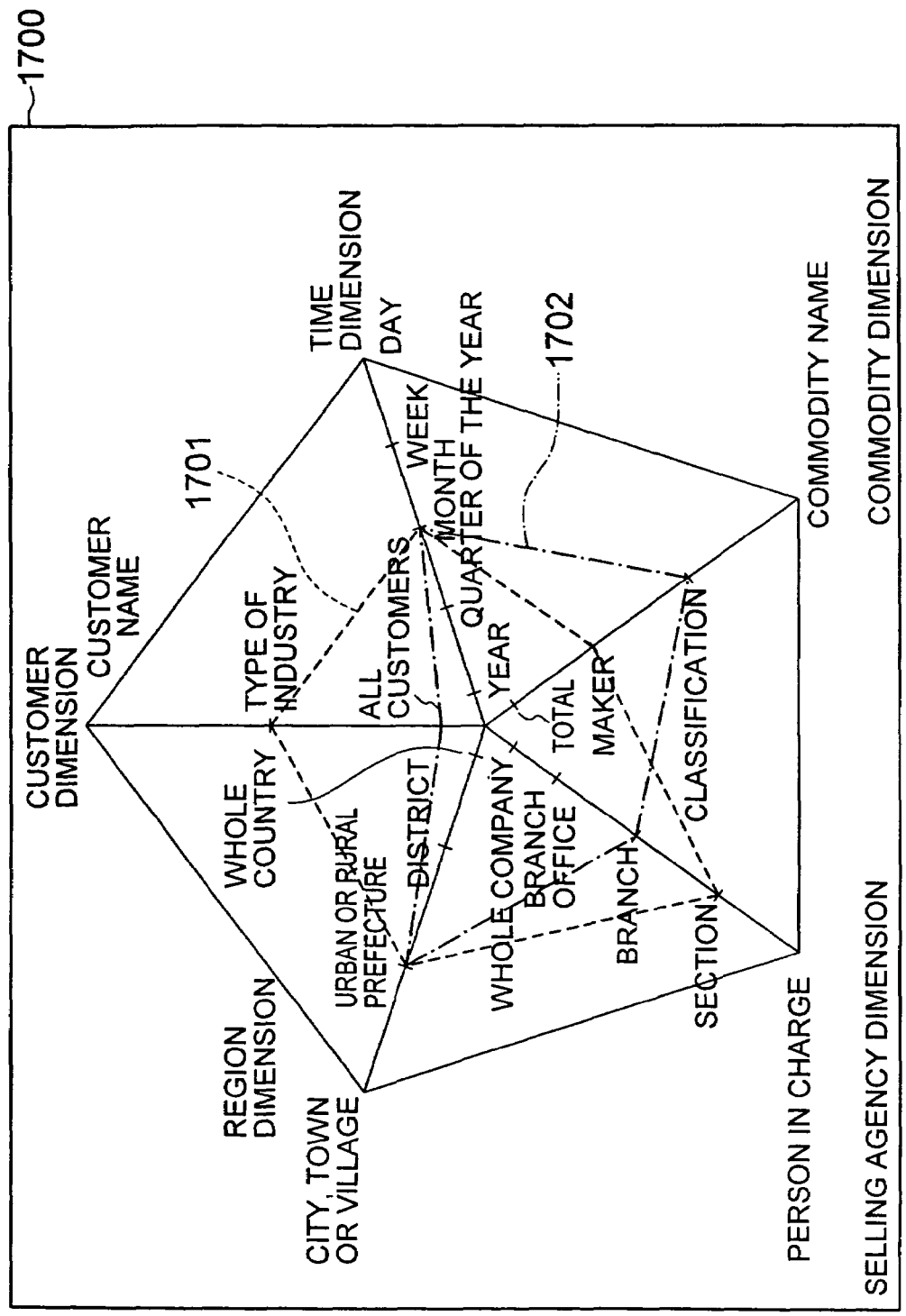
FIG. 17 is a diagram showing an aggregate pattern display example in conditioned aggregate pattern display processing.

First, aggregate patterns each having a response time for aggregate query of at least one minute are selected. Under the display condition that the response time for query is at least one minute, aggregate patterns meeting the condition are displayed. The system acquires the response time for aggregate query of each aggregate pattern from the aggregate pattern information table 500. By referring to the acquired response time for aggregate query, the system specifies aggregate patterns having a response time for aggregate query of at least one minute, and registers those aggregate patterns in the displayed pattern list table. The state of the registered displayed pattern list table is shown in FIG. 13. Subsequently, from among all aggregate patterns registered in the displayed pattern list table 1300, aggregate patterns which are not registered in the invalid pattern list table 2304 are displayed on the graph. As a result, an aggregate pattern 1701 and an aggregate pattern 1702 are displayed on a graph 1700 as shown in FIG. 17.

Subsequently, in order to increase the speed of aggregation processing of the aggregate pattern 1701 and the aggregate pattern 1702, pre-aggregate candidates to be added are selected.

The response time for aggregate query becomes the shortest in the case where respective aggregate patterns are selected as pre-aggregate cubes. First, therefore, it is assumed that the aggregate pattern 1701 and the aggregate pattern 1702 are pre-aggregated.

In order to examine the disk usage capacity in the case where both aggregate patterns are pre-aggregated, the total data size of both aggregate patterns is displayed. First, aggregate pattern information of the aggregate pattern 1701 is displayed. The aggregate pattern 1701 on the graph is selected, and the aggregate pattern information is displayed. The system registers the selected aggregate pattern in the information-displayed pattern list table. The state of the registered information-displayed pattern list table is shown in FIG. 14. Subsequently, from the aggregate pattern information table 500, the system acquires information corresponding to an aggregate pattern registered in the information-displayed pattern list table 1400, and displays the acquired information on the screen.

As a result, the total data size of the aggregate pattern 1701 is 338.4 KB as shown in FIG. 6. In the same way, the total data size of the aggregate pattern 1702 is 112.8 KB.

The disk usage quantity in the case where both aggregate patterns are pre-aggregated is the sum of the total data sizes of both aggregate patterns. In this case, the disk usage quantity becomes 451.2 KB, and it exceeds 430 KB. Therefore, both aggregate patterns cannot be made pre-aggregate cubes. In order to increase the speed of the aggregation processing of the aggregate pattern 1701 and the aggregate pattern 1702, therefore, it is necessary to select pre-aggregate cubes other than both aggregate patterns.

In order to narrow down the pre-aggregate cube candidates, source cube patterns of the aggregate pattern 1701 and the aggregate pattern 1702 at the present time are specified. First, the source cube pattern of the aggregate pattern 1701 is specified. The aggregate pattern 1701 displayed on the graph is selected and the source cube pattern is displayed. By referring to the pre-aggregate cube list table 1500, the system derives the source cube pattern of the selected aggregate pattern 1701.

Figure 18:
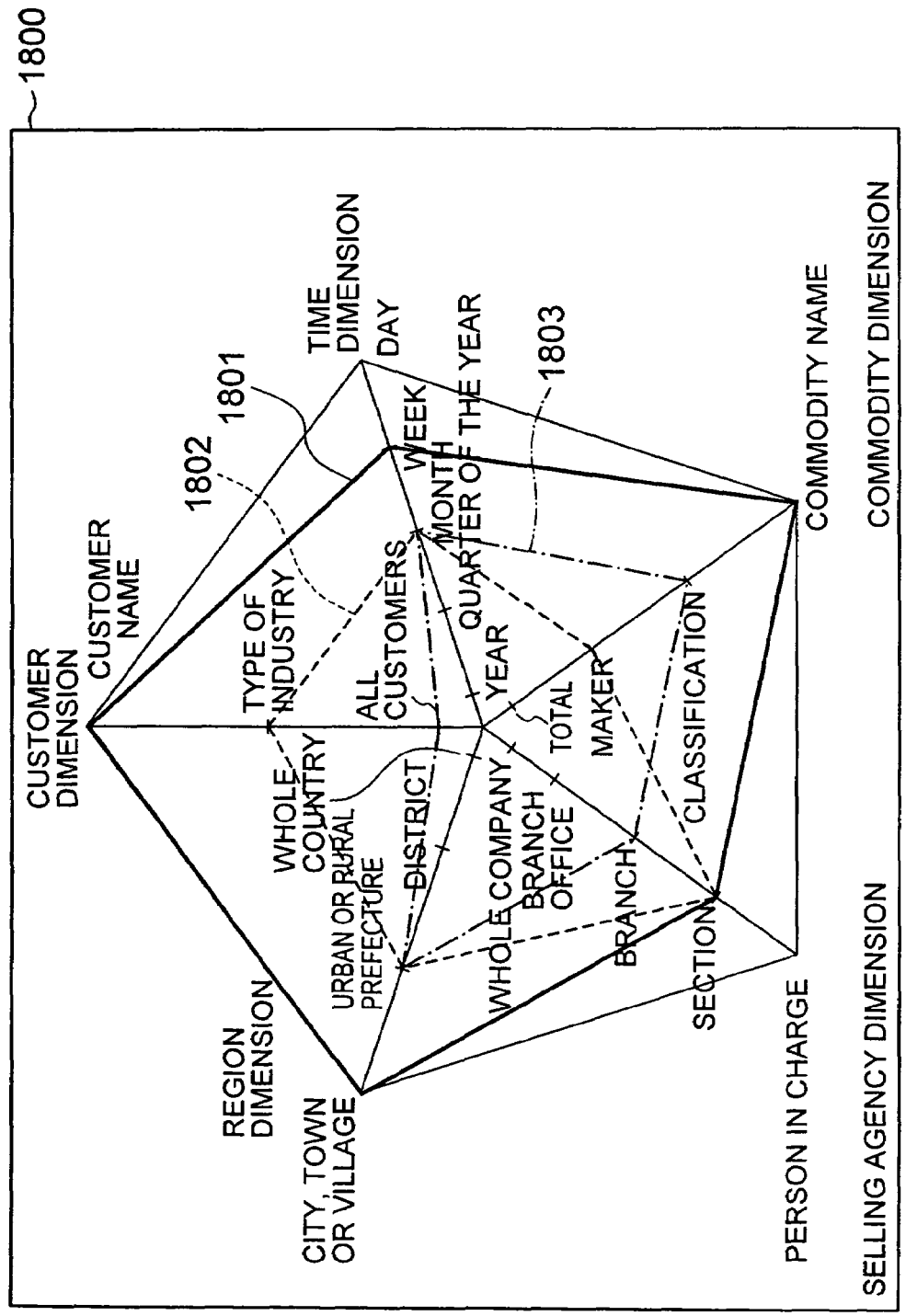
FIG. 18 is a diagram showing a source cube pattern display example in source cube pattern display processing.

As a result, a source cube pattern 1801 is displayed on a graph 1800 as shown in FIG. 18. In the graph 1800, a pentagon 1802 represents the aggregate pattern 1701, and a pentagon 1803 represents the aggregate pattern 1702. By conducting similar processing on the aggregate pattern 1702 as well, the same source cube pattern 1801 is displayed.

Therefore, the source cube pattern of the aggregate pattern 1701 and the source cube pattern of the aggregate pattern 1702 at the present time point are the same aggregate pattern 1801.

For shortening the response time for aggregate query of the aggregate pattern 1701 and the aggregate pattern 1702, it is necessary to make an aggregate pattern less in number of data than the aggregate pattern 1801 the pre-aggregate cube. Because the response time for aggregate query becomes shorter as the number of data of the source cube pattern is decreased.

Subsequently, pre-aggregate cubes are narrowed down by using position relations of figures on the graph 100.

In the graph 100, an aggregation level of a graduation located nearer the center has fewer members. Therefore, a pentagon having vertexes located nearer the center represents an aggregate pattern having a smaller number of data.

Furthermore, if a pentagon is completely surrounded by a different pentagon, the graph 100 shows that the aggregating value of the aggregate pattern represented by the former pentagon can be calculated from the aggregating value of the aggregate pattern represented by the latter pentagon. Therefore, a pentagon representing a source cube pattern must completely include a pentagon representing an aggregate pattern of aggregation destination.

Figure 19:
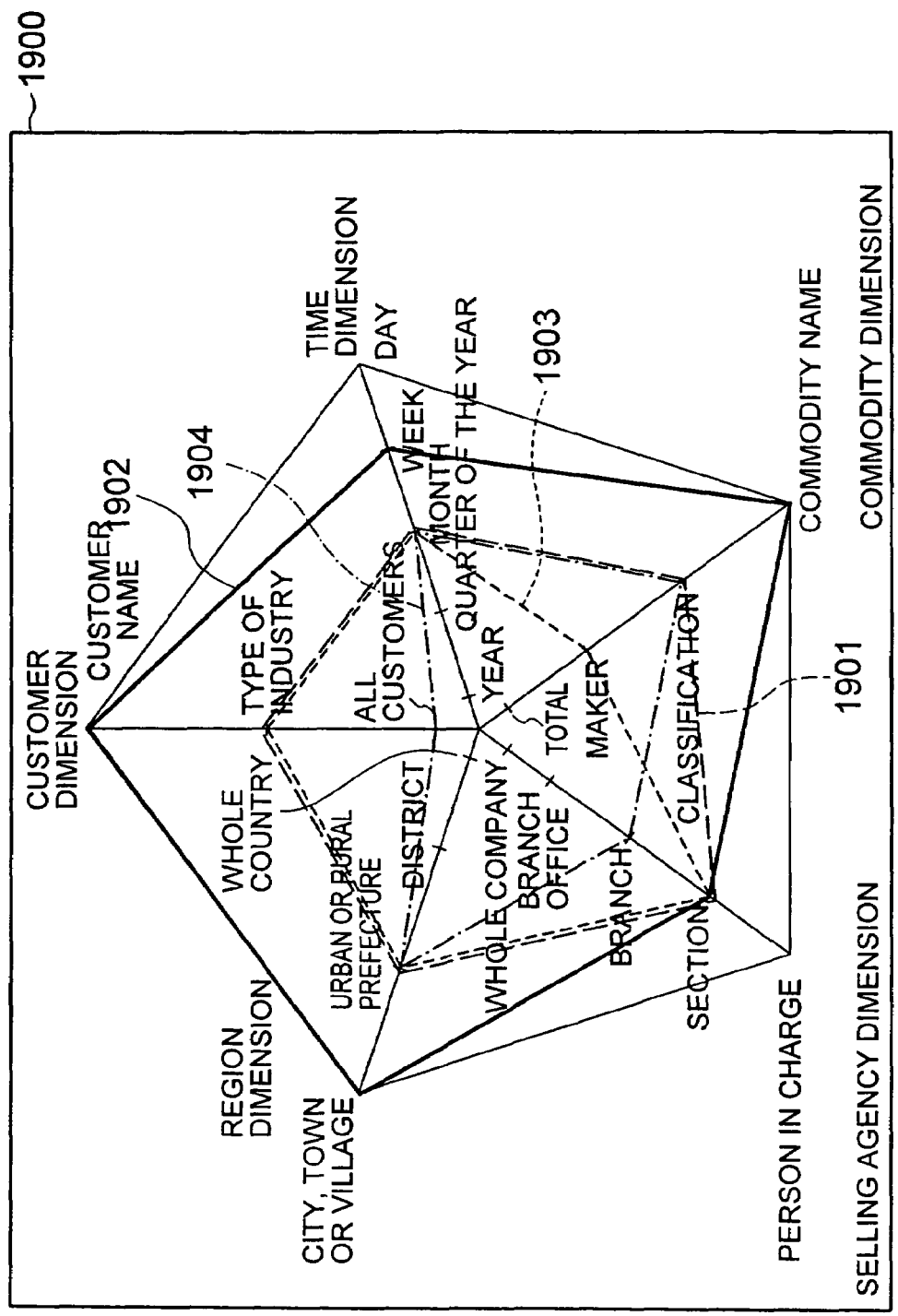
FIG. 19 is a diagram showing an aggregate pattern inputted as a pre-aggregate cube in an example of pre-aggregate narrowing down processing.

By taking the facts heretofore described into consideration, pre-aggregate cube candidates are selected. As a result, a pentagon 1902 shown in FIG. 19 is selected. In a graph 1900, pentagons 1902, 1903 and 1904 represent the source cube pattern 1801, the aggregate pattern 1701, and the aggregate pattern 1702.

Among pentagons completely surrounding the pentagon 1903 and the pentagon 1904, the pentagon 1901 is a pentagon having most inside vertexes on respective coordinate axes. Among aggregate patterns which become source cubes of both the aggregate pattern 1701 and the aggregate pattern 1702, the aggregate pattern 1901 has the least number of data.

Furthermore, vertexes of the pentagon 1901 are located inside the pentagon 1902. Therefore, the number of data of the aggregate pattern 1901 is smaller than the number of data of the aggregate pattern 1801. By making the aggregate pattern 1901 the source cube, therefore, the response time for aggregate query of the aggregate pattern 1701 and the aggregate pattern 1702 can be shortened.

Figure 20:
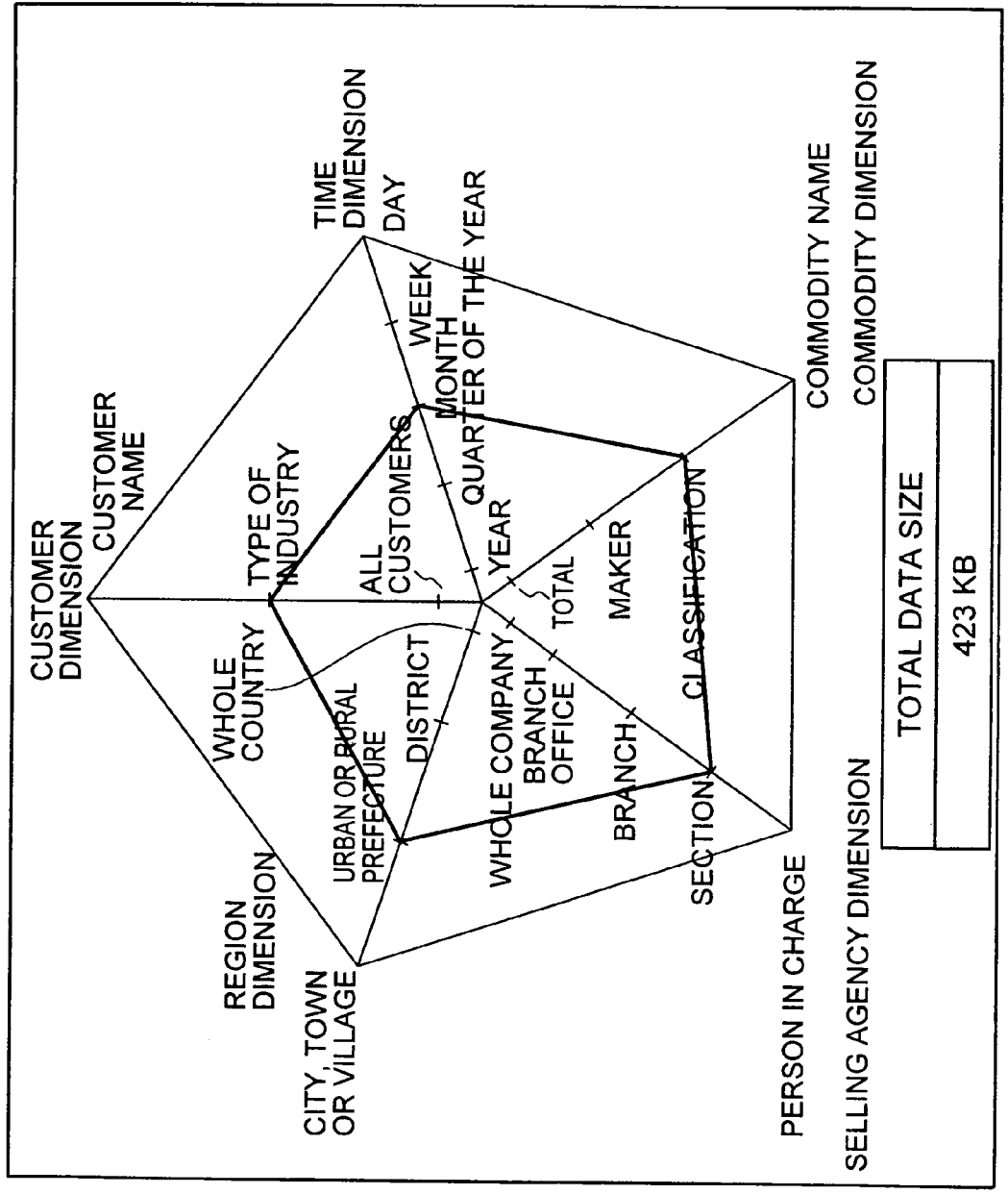
FIG. 20 is a diagram showing a display example of aggregate pattern information.

Subsequently, the total data size of the aggregate pattern 1901 is ascertained. By inputting an information display instruction of the aggregate pattern 1901, the total data size is displayed. The result is 423 KB as shown in FIG. 20, and it satisfies the condition of the disk usage quantity. Among source cube patterns each having a disk usage quantity of at most 430 KB, therefore, the aggregate pattern 1901 is a source cube pattern having the highest possibility of making the response time for aggregate query of the aggregate pattern 1701 at most one minute and the response time for aggregate query of the aggregate pattern 1702 at most one minute.

Finally, the aggregate pattern 1901 is selected on the screen as pre-aggregate candidates, and inputted to the system. The system registers the inputted aggregate pattern in the pre-aggregate cube list table. Subsequently, the aggregate pattern information table is recreated in response to addition of a pre-aggregate cube. On the basis of its result, the expected response time for aggregate query of the aggregate pattern 1701 and the expected response time for aggregate query of the aggregate pattern 1702 are ascertained. If the response time for aggregate query of both aggregate patterns is at most one minute, it turns out that aggregation processing performance has been realized.

By the procedure heretofore described, a pre-aggregate cube satisfying the user's request can be selected efficiently from among a large number of aggregate patterns.

By the way, the method for displaying a multidimensional aggregate pattern in the present embodiment is not restricted to the method shown in FIG. 3. The display method using radial coordinate axes and polygons as shown in FIG. 3 is one example. For example, it is also possible to effect display by using parallel coordinate axes and broken lines as shown in FIG. 21.

Figure 21:
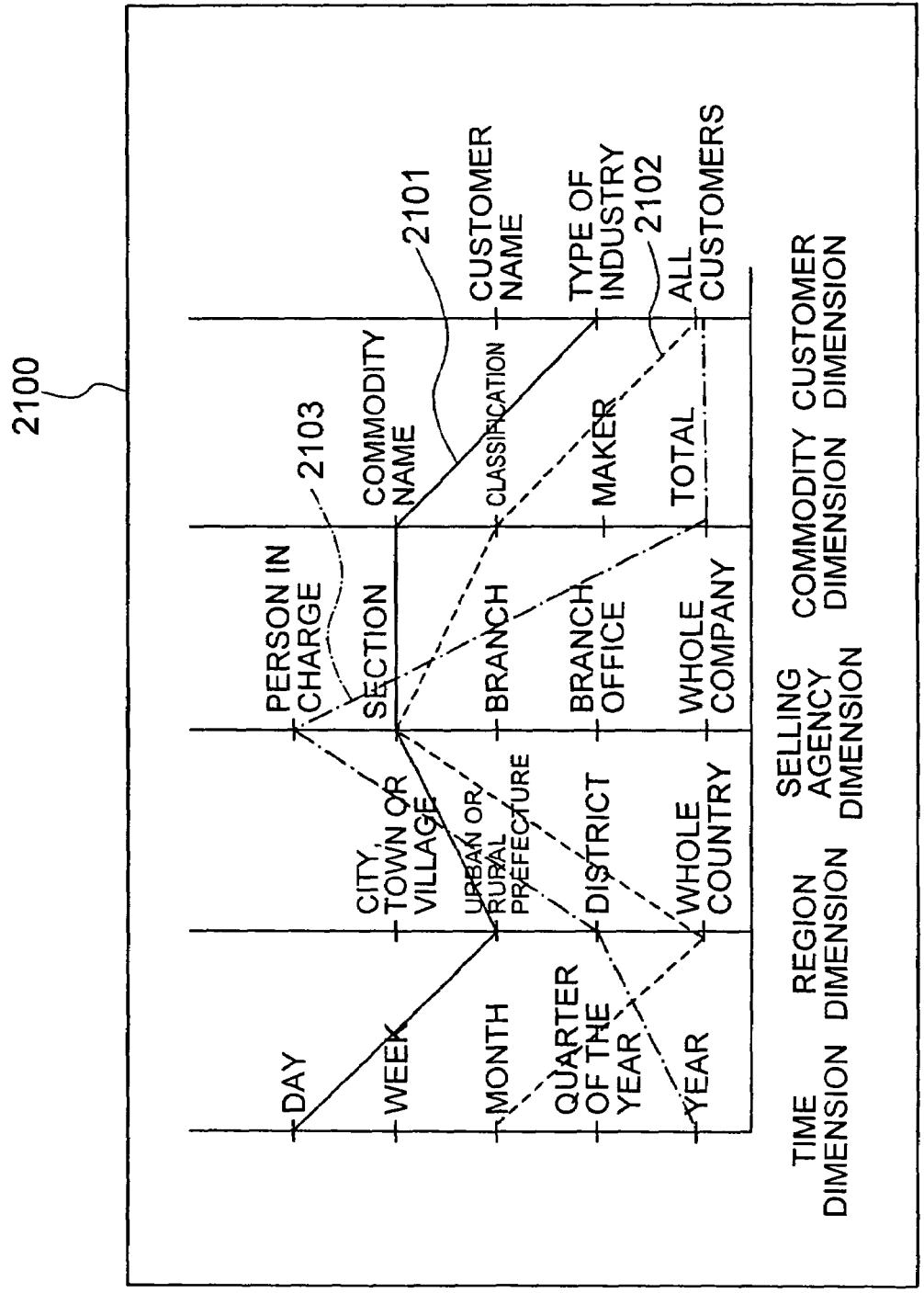
FIG. 21 is a diagram showing an example of parallel coordinate axes which is an embodiment of coordinate axes for displaying a multidimensional aggregate pattern.

In the form shown in FIG. 21 as well, relations among aggregate patterns can be displayed by position relations of broken lines. In a graph 2100, graduations are arranged from the bottom toward the top in the descending order of the aggregation levels. Therefore, the aggregating value of an aggregate pattern represented by a broken line located below a certain broken line can be calculated from the aggregating value of an aggregate pattern represented by the latter cited broken line. In the example of FIG. 21, a broken line representing an aggregate pattern 2102 is located under a broken line representing a source cube pattern 2101. Therefore, the aggregating value of the aggregate pattern 2102 can be calculated from the aggregating value of the source cube pattern 2101. On the other hand, a broken line representing an aggregate pattern 2103 and the broken line representing the source cube pattern 2101 cross each other. Therefore, the aggregating value of the aggregate pattern 2103 cannot be calculated from the aggregating value of the source cube pattern 2101.

Without being limited to graphs having forms shown in FIGS. 17 and 21, the present invention can be applied to graphs of any form so long as relations among aggregate patterns can be displayed by position relations of figures representing aggregate patterns.

Figure 22:
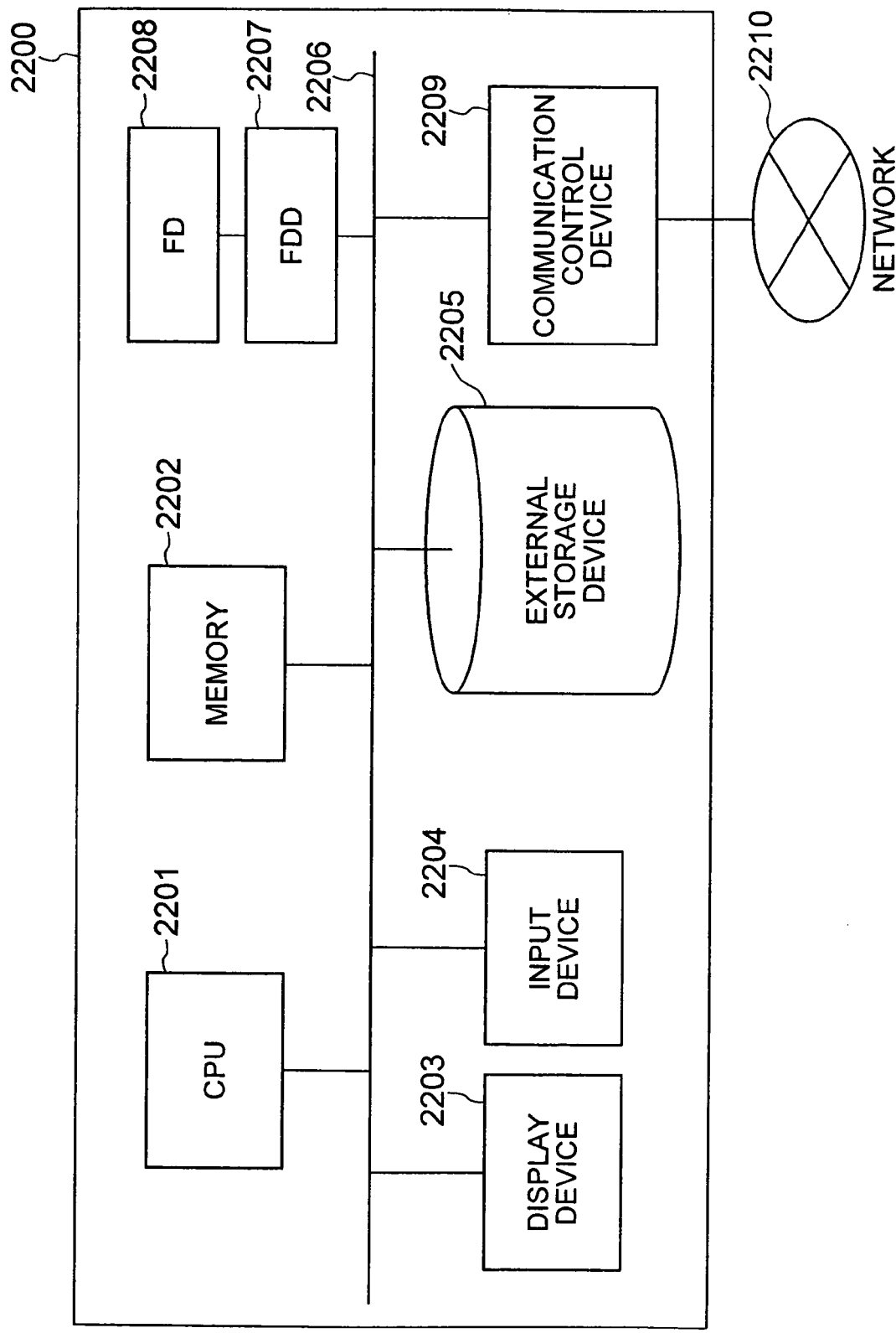
FIG. 22 is a diagram showing a system of an embodiment of a multidimensional database management system according to the present invention.

FIG. 22 is a diagram showing the configuration of a system to which the multidimensional aggregate pattern display method and input method of the present invention is applied. In a computer 2200, a CPU 2201, a memory 2202, a display device 2203, an input device 2204, an external storage device 2205, a floppy disk drive 2207, and a communication control device 2209 are connected via a bus 2206.

For example, in response to a display instruction inputted by using the input device 2204, the computer 2200 including the above described components displays multidimensional aggregate patterns on the display device 2203. Furthermore, in response to an input instruction inputted by using the input device 2204, the computer 2200 stores the multidimensional aggregate patterns displayed on the display device 2203 into the external storage device 2205.

The CPU 2201 executes software stored in the memory 2202.

The display device 2203 displays coordinate axes, multidimensional aggregate patterns, and their information. Furthermore, according to user's operation, a pointer is displayed.

The input device is, for example, a mouse and a keyboard. As position information of a pointer on the screen of the display device 2203, a selected multidimensional aggregate pattern is outputted to the CPU 2201. Furthermore, in response to user's keyboard input, a display instruction or an input instruction is outputted to the CPU 2201.

The floppy disk drive 2207 is used to read/write data from/to the floppy disk 2208.

The communication control device 2209 is used for communication conducted via the network, such as data exchange with another computer.

A program including the present invention is set in the memory 2202 via the floppy disk 2208 or a network 2210. In the present embodiment, the floppy disk drive 2207 is used for giving and taking a program and data with outside.

Alternatively, a different kind of portable medium such as an optical magnetic disk or a write-once optical disk may be used.

Figure 23:
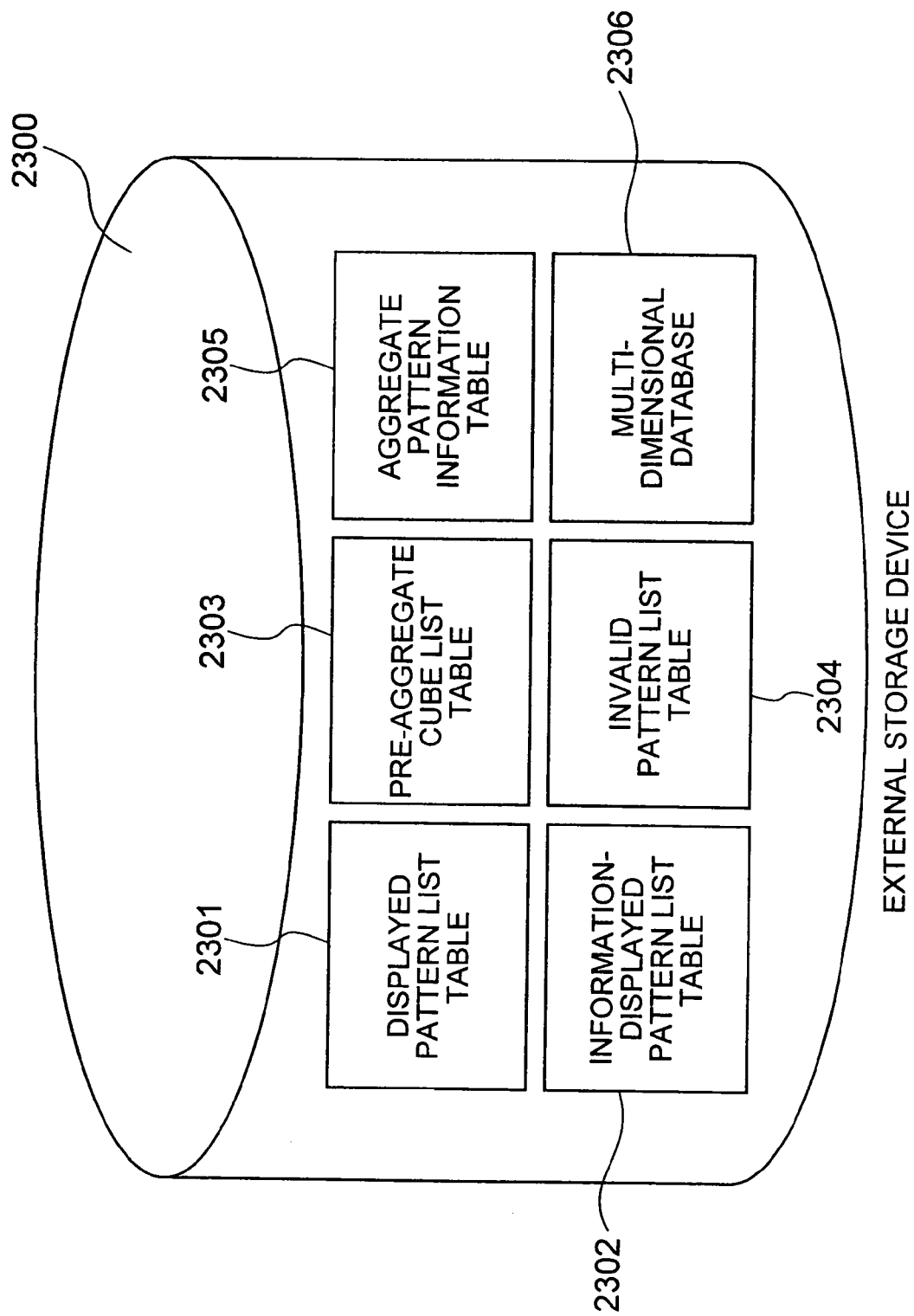
FIG. 23 is a diagram showing information stored in an external storage device in a system of an embodiment of a multidimensional database management system according to the present invention.

FIG. 23 is a diagram showing information stored in the external storage device 2205 of the computer 2200 (FIG. 22). In the external storage device 2205, a displayed pattern list table 2301, an information-displayed pattern list table 2302, a pre-aggregate cube list table 2303, an invalid pattern list table 2304, an aggregate pattern information table 2305, and a multidimensional database 2306 are stored.

Figure 24:
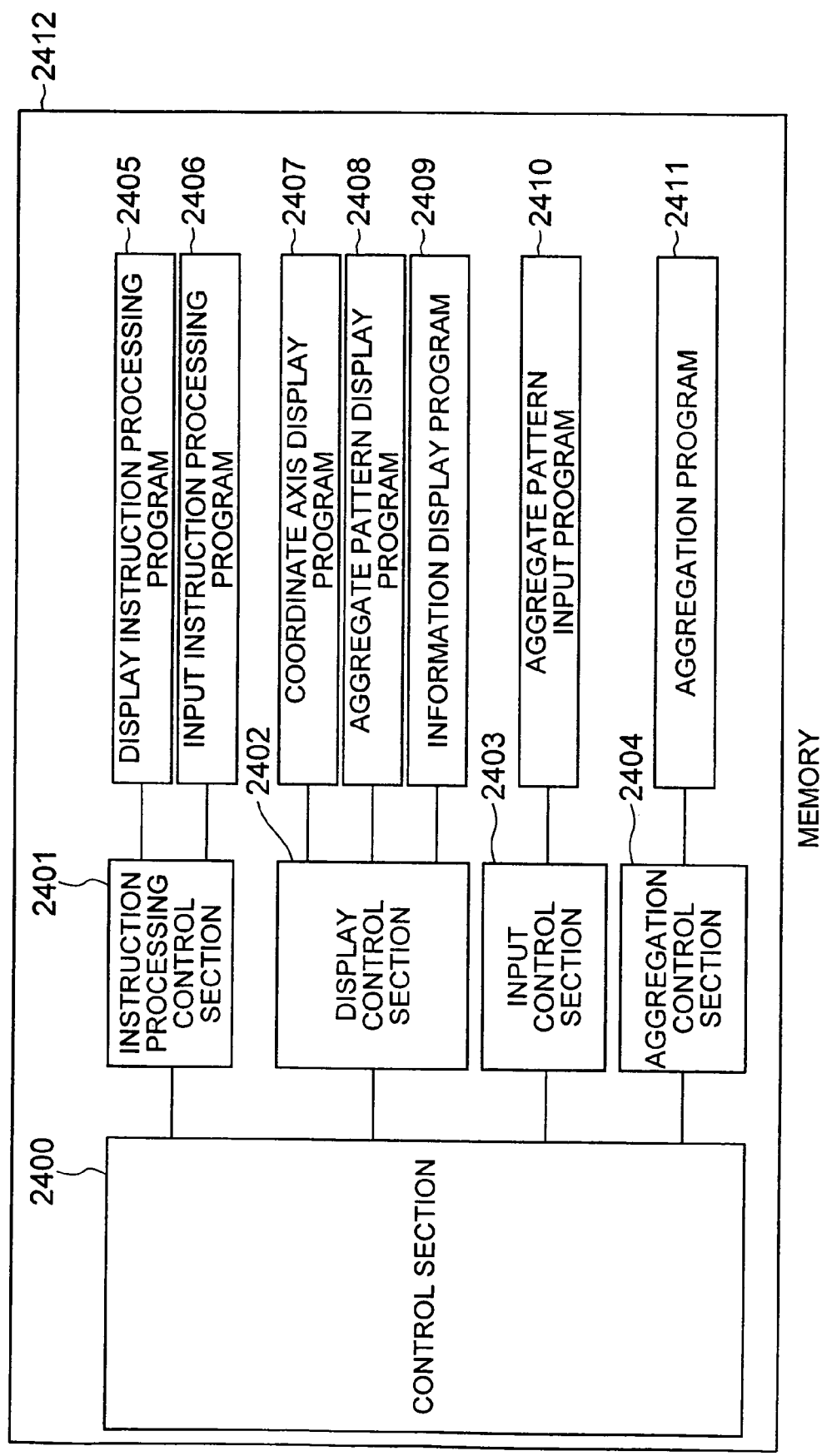
FIG. 24 is a diagram showing information stored in a memory in a system of an embodiment of a multidimensional database management system according to the present invention.

FIG. 24 is a diagram showing information stored in the memory 2202 of the computer 2200 (FIG. 22). In the memory 2202, a control section 2400 is stored.

The control section 2400 includes an instruction processing control section 2401, a display control section 2402, an input control section 2403, and aggregation control section 2404.

By using a display instruction processing program 2405 and an input instruction processing program 2406, the instruction processing control section 2401 accepts a display instruction or an input instruction from the input device 2204, and orders the display control section 2402 or the input control section 2403 to execute the instruction.

The display instruction processing program 2405 is a program for receiving and processing a user's display instruction. If the user's instruction is an information display instruction, then an aggregate pattern input program 2410 is executed by using the information-displayed pattern list table 2302 as an input source. Aggregate patterns for which information should be displayed are inputted to the displayed pattern list table 2301. An information display program 2409 is executed, and the information of the aggregate patterns is displayed on the display device 2203. If the user's instruction is a pattern display instruction, then an aggregate pattern display program 2408 is executed, aggregate patterns are displayed on the display device 2203.

The input instruction processing program 2406 is a program for receiving and processing a user's input instruction. If the user's instruction is a pre-aggregate cube input instruction, then an aggregate pattern input program 2410 is executed by setting the pre-aggregate cube list table 2303 as an input destination. If the user's instruction is an invalid pattern list input instruction, then an aggregate pattern input program 2410 is executed by setting the invalid pattern list table 2304 as an input source.

The display control section 2402 includes a coordinate axis display program 2407, an aggregate pattern display program 2408, and an information display program 2409. In response to an order from the instruction processing control section 2401, the display control section 2402 displays coordinate axes, multidimensional aggregate patterns, or information of the multidimensional aggregate patterns on the display device 2203.

Under an order from the display instruction processing program 2405 or the input instruction processing program 2406, the coordinate axis display program 2407 displays coordinate axes for displaying aggregate patterns, on the display device 2203.

Under an order from the display instruction processing program 2405, the aggregate pattern display program 2408 displays aggregate patterns registered in the displayed pattern list table 2301, on the display device 2203.

Under an order from the display instruction processing program 2405, the information display program 2409 displays information of aggregate patterns registered in the information-displayed pattern list table 2302.

Under an order from the instruction processing control section 2401, the input control section 2403 stores aggregate patterns inputted via the display device 2203 and the input device 2204 into the external storage device 2205 by using the aggregate pattern input program 2410.

The aggregate pattern input program 2410 is a program for inputting aggregate patterns selected by the user to a specified input destination, under an order of the input instruction processing program 2406.

The aggregation control section 2404 executes aggregation processing by using an aggregation program 2411. By referring to the pre-aggregate cube list table 2303, the aggregation program 2411 executes pre-aggregation processing, and stores multidimensional data and an aggregation result in a multidimensional database 2306. Furthermore, by referring to the pre-aggregate cube list table 2303 and a hierarchy information table of the multidimensional database 2306, the aggregation program 2411 creates the aggregate pattern information table 2305. At the time of an aggregation processing request, the aggregation program 2411 determines source of aggregation by referring to the pre-aggregate cube list table 2303, executes aggregation processing, and returns a result of aggregation. As the source of aggregation, data of an aggregate pattern having the least number of data is selected from among aggregate patterns which are lower in aggregation level of every dimension than a requested aggregate pattern.

Figure 25:
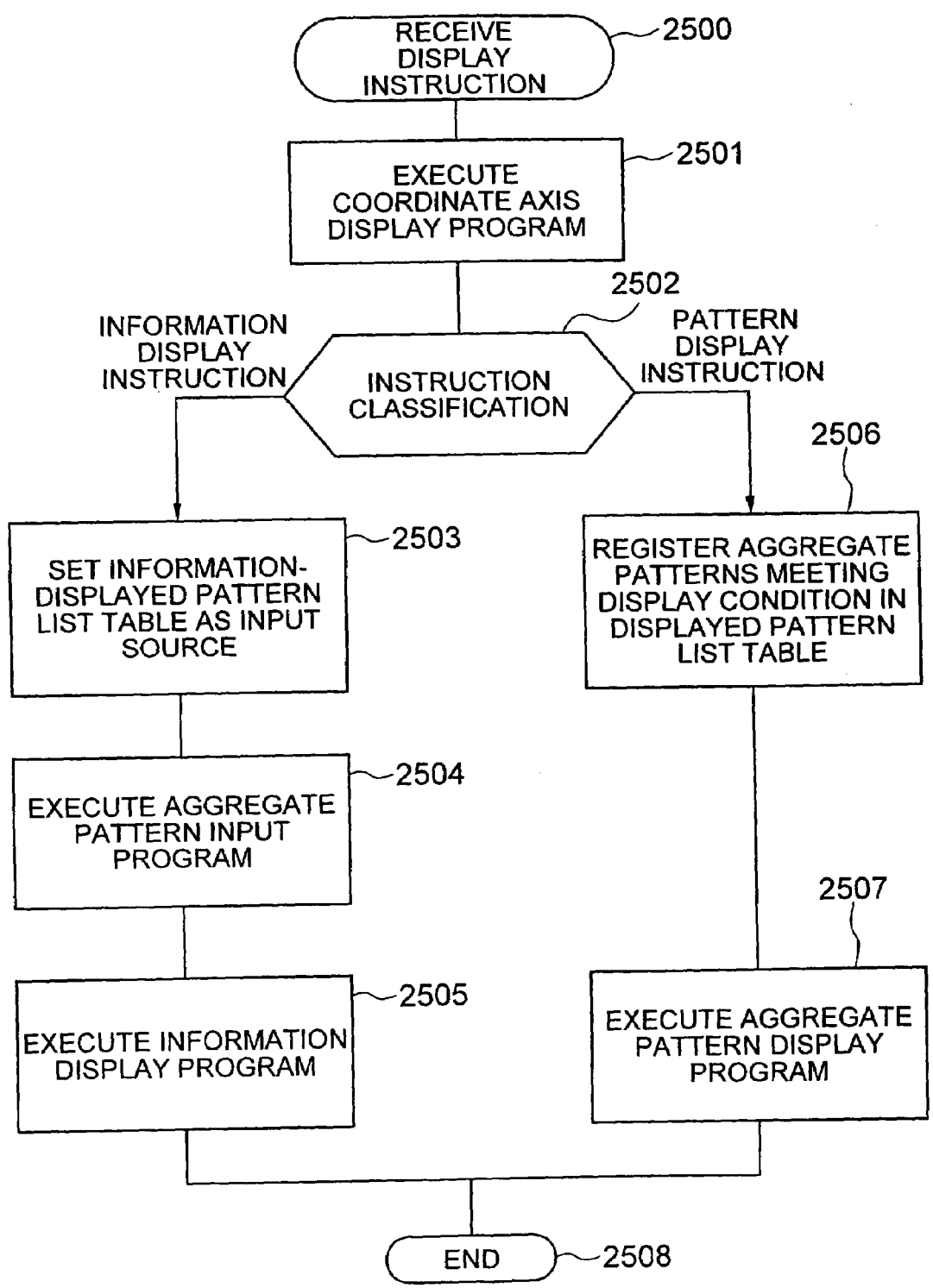
FIG. 25 is a flow chart of a display instruction processing program.

FIG. 25 is a flow chart of the display instruction processing program 2405.

At step 2500, a display instruction of the user is received from the input device 2204. The display instruction includes an instruction classification and a display condition. As for the instruction classification, there is the information display instruction and the pattern display instruction. The information display instruction is an instruction for displaying information of selected aggregate patterns. The pattern display instruction is an instruction for displaying figures representing aggregate patterns meeting a specified display condition.

In the above described example of the narrowing down processing, a display instruction of aggregate patterns requiring a response time for aggregate query of at least one minute, an aggregate pattern information display instruction of the aggregate pattern 1701, and a source cube pattern display information of the aggregate pattern 1701 (FIG. 17) are inputted. In the case of a display instruction of an aggregate pattern having a response time for aggregate query of at least one minute, the instruction classification is the pattern display instruction, and the display condition is that the response time for aggregate query is at least one minute. In the case of a total data size display instruction of the aggregate pattern 1701, the instruction classification is the pattern display instruction, and the display condition is not specified. In the case of a source cube pattern display instruction of the aggregate pattern 1701, the instruction classification is the information display instruction, and the display condition is that the aggregate pattern is a source cube pattern of the aggregate pattern 1701.

At step 2501, execution of the coordinate axis display program 2407 is ordered, and coordinate axes are displayed on the display device 2203.

In the above described example of the narrowing down processing, the graph 100 shown in FIG. 1 is displayed on the screen.

At step 2502, the instruction classification of the display instruction inputted by the user is judged. In the case of the information display instruction, the processing proceeds to step 2503. In the case of the pattern display instruction, the processing proceeds to step 2506.

In the above described example of the narrowing down processing, the processing proceeds to step 2503 in the case of the display instruction of an aggregate pattern having a response time for aggregate query of at least one minute and the source cube pattern display instruction of the aggregate pattern 1701. In the case of the aggregate pattern information display instruction of the aggregate pattern 1701, the processing proceeds to step 2503.

First, the case of the information display instruction will now be described.

At step 2503, the information-displayed pattern list table 2302 is set as the input source of the aggregate pattern input program 2410.

In the above described example of the narrowing down processing, the information-displayed pattern list table 2302 is set as the input source.

At step 2504, execution of the aggregate pattern input program 2410 is ordered, and aggregate patterns selected by the user are registered in the information-displayed pattern list table 2301.

In the above described example of the narrowing down processing, the aggregate pattern 1701 is inputted to the information-displayed pattern list table 2302 by using the aggregate pattern input program 2410. A result of inputting is shown in FIG. 14.

At step 2505, execution of the information display program 2409 is ordered, and information of aggregate patterns selected by the user is displayed on the display device 2203.

In the above described example of the narrowing down processing, the total data size of the aggregate pattern 1701 is displayed on the display device 2203.

By executing steps heretofore described, information of aggregate patterns selected by the user is displayed on the display device 2203. In the above described example of the narrowing down processing, the pentagon 601 representing the aggregate pattern 1701 and its total data size 602 are displayed on the display device 2203 as shown in FIG. 6.

The case of the pattern display instruction will now be described.

At step 2506, aggregate patterns meeting the display condition included in the display example are specified by referring to the aggregate pattern information table 2305, and the specified aggregate patterns are registered in the displayed pattern list table 2301.

In the above described example of the narrowing down processing, there are the case of a display instruction of aggregate patterns having a response time for aggregate query of at least one minute, and the case of a source cube pattern display instruction of the aggregate pattern 1701.

In the case of a display instruction of an aggregate pattern having a response time for aggregate query of at least one minute, aggregate patterns having a response time for aggregate query of at least one minute are specified by referring to the aggregate pattern information table 500 (FIG. 5), and registered in the displayed pattern list table 2301. As a result, the aggregate pattern 1701 and the aggregate pattern 1702 are registered in the displayed pattern list table 1300 as shown in FIG. 13.

In the case of the source cube pattern display instruction of the aggregate pattern 1701, aggregate patterns each having aggregation levels which are equivalent in every coordinate axis to at most aggregation levels of the aggregate pattern 1701 are selected from among aggregate patterns registered in the pre-aggregate cube list table 1500, by referring to the pre-aggregate cube list table 1500 (FIG. 15) and the hierarchy information table 1100 (FIG. 11). From among the selected aggregate patterns, an aggregate pattern having the least number of data is selected as a source cube pattern. As a result, the aggregate pattern 1801 (FIG. 18) is selected as the source cube pattern, and registered in the displayed pattern list table 2301.

At step 2507, execution of the aggregate pattern display program 2408 is executed, and the aggregate patterns registered in the displayed pattern list table 2301 are displayed on the display device 2203.

In the case of a display instruction of aggregate patterns having a response time for aggregate query of at least one minute, the aggregate pattern 1701 and the aggregate pattern 1702 are displayed on the display device 2203 as shown in FIG. 17. In the case of the source cube pattern display instruction of the aggregate pattern 1701, the aggregate pattern 1801 is displayed on the display device 2203 as shown in FIG. 18.

By executing the steps heretofore described, an aggregate pattern specified by the user is displayed on the display device 2203.

Figure 26:
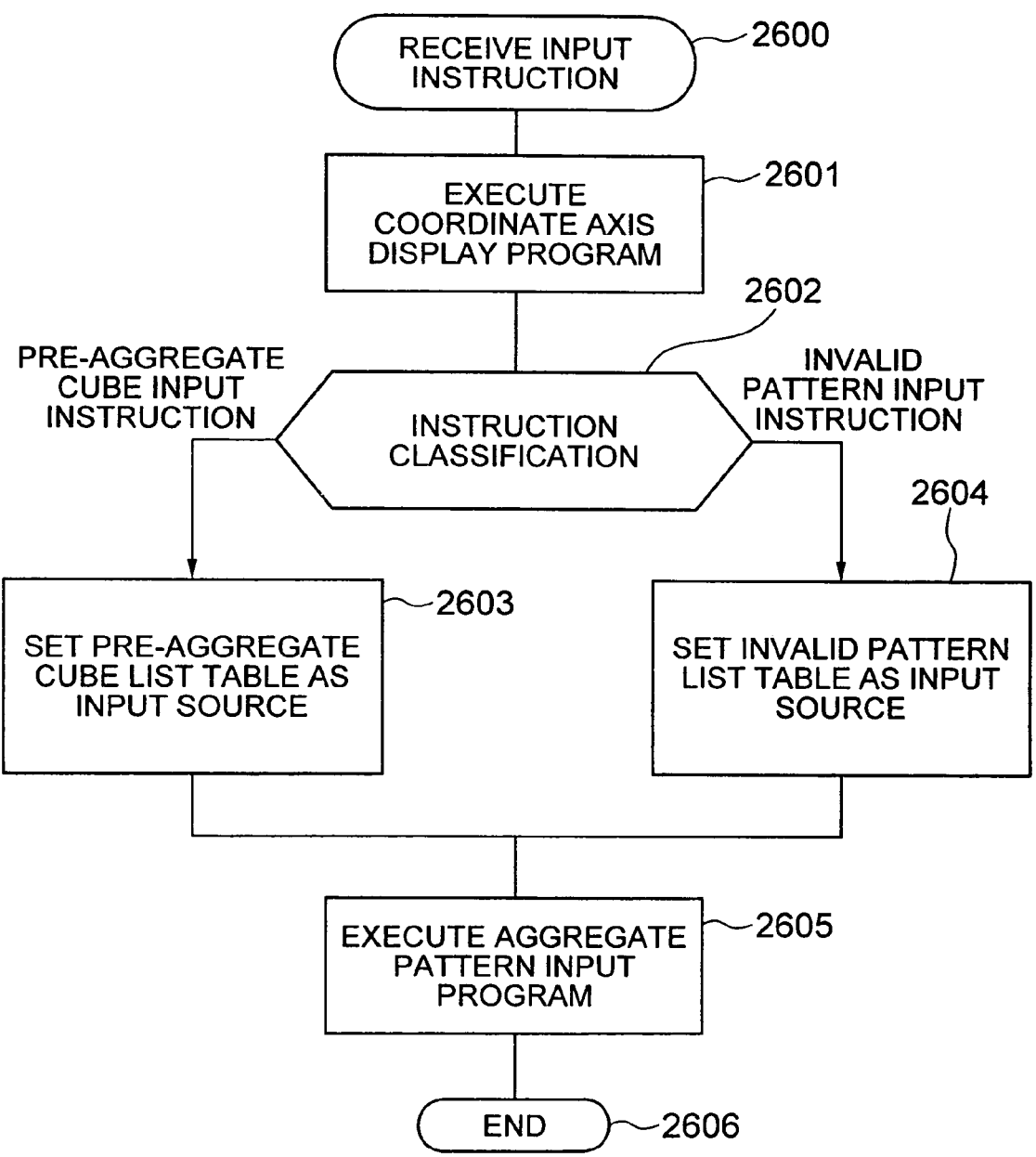
FIG. 26 is a flow chart of an input instruction processing program.

FIG. 26 is a flow chart of the input instruction processing program 2406.

At step 2600, a user's input instruction is received from the input device 2204. The input instruction includes the instruction classification. As the instruction classification, there are a pre-aggregate cube input instruction and an invalid pattern input instruction. The pre-aggregate cube input instruction is an instruction for inputting a specified aggregate pattern as a pre-aggregate cube. The invalid pattern input instruction is an instruction for inputting a specified aggregate pattern as an invalid pattern.

In the above described example of the narrowing down processing, an instruction for inputting the aggregate pattern 1901 as a pre-aggregate candidate is inputted. The instruction classification is the pre-aggregate cube input instruction.

At step 2601, execution of the coordinate axis display program 2407 is executed, and coordinate axes are displayed on the display device 2203.

In the above described example of the narrowing processing, the graph 100 shown in FIG. 1 is displayed on the screen by the coordinate axis display program 2407.

At step 2602, the input instruction classification is judged. In the case of the pre-aggregate cube input instruction, the processing proceeds to step 2603. In the case of the invalid pattern input instruction, the processing proceeds to step 2604.

In the above described example of the narrowing processing, the instruction is the pre-aggregate cube input instruction, and consequently the processing proceeds to step 2603.

First, the case of the pre-aggregate cube input instruction will now be described.

At the step 2603, the pre-aggregate cube list table 2303 is set as the input source of the aggregate pattern input program 2410. Thereafter, the processing proceeds to step 2605.

In the above described example of the narrowing processing, the pre-aggregate cube list table 2303 is set as the input source of the aggregate pattern.

The case of the invalid pattern input instruction will now be described.

At the step 2604, the invalid pattern list table 2304 is set as the input source of the aggregate pattern input program 2410. Thereafter, the processing proceeds to step 2605.

For example, if the user has instructed to input an aggregate pattern having "year" as an aggregation level of the time dimension, having "commodity name" as an aggregation level of the commodity dimension, "person in charge" as an aggregation level of the selling agency dimension, "district" as an aggregation level of the region dimension, and "all customers" as an aggregation level of the customer dimension, as an invalid pattern, then the invalid pattern list table 2304 is registered as the input destination of the aggregate pattern. In this case, a result obtained by executing the aggregate pattern input program 2410 is shown in FIG. 16.

At the step 2605, execution of the aggregate pattern input program 2410 is ordered, and an aggregate pattern selected by the user is inputted to the input source.

In the example of the above described example of the narrowing down processing, the aggregate pattern 1901 is added to the pre-aggregate cube list table 1500.

By executing steps heretofore described, the aggregate pattern selected by the user is inputted to the pre-aggregate cube list table 2303 or the invalid pattern list table 2304.

Figure 27:
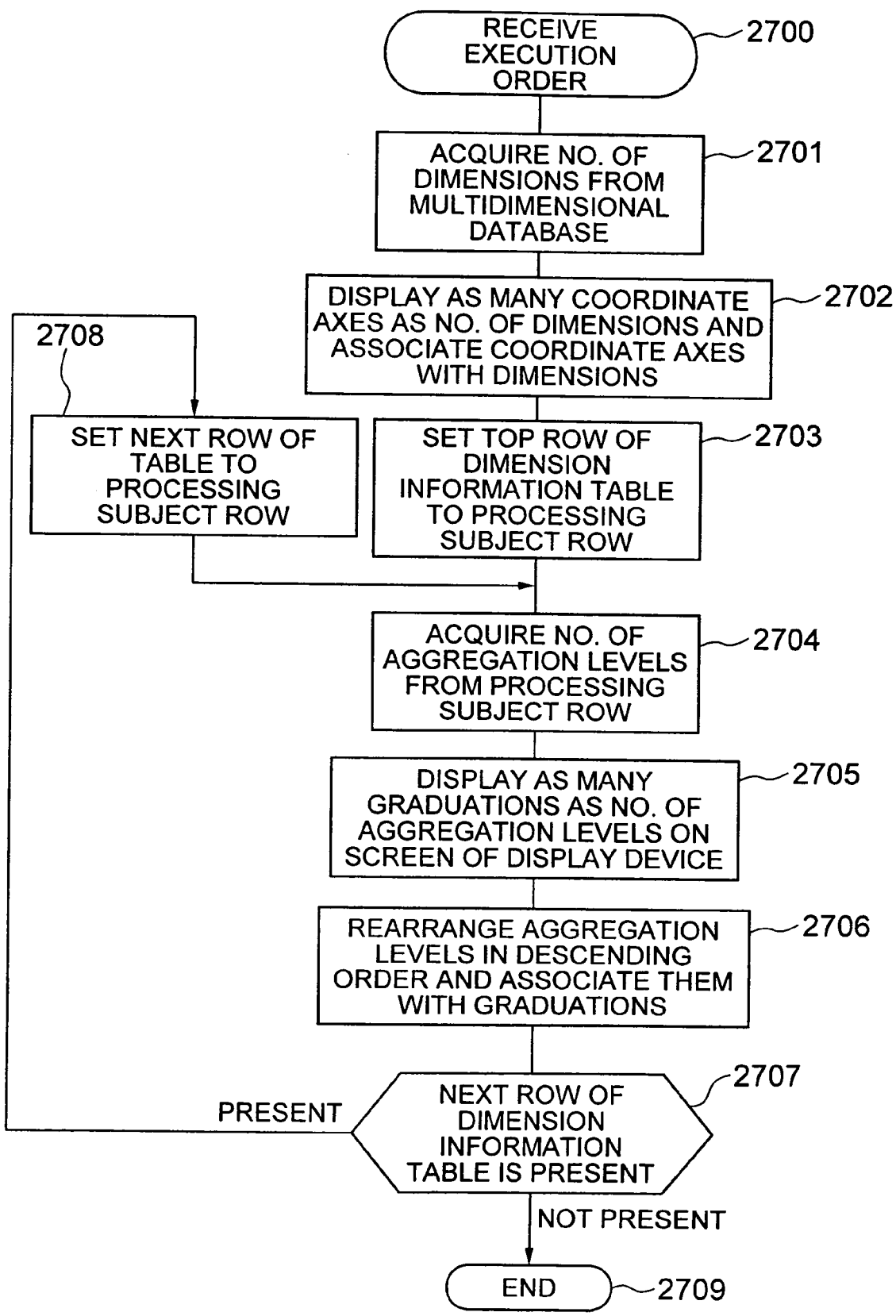
FIG. 27 is a flow chart of a coordinate display program.

FIG. 27 is a flow chart of the coordinate axis display program 2407. In the above described example of the narrowing down processing, the processing of displaying the graph 100 (FIG. 1) corresponds thereto.

At step 2700, an execution order is received. Execution is ordered by the display instruction processing program 2405 or the input instruction processing program 2406.

At step 2701, the number of dimensions of the multidimensional data to be processed is acquired from the multidimensional database 2306.

In the above described example of the narrowing down processing, the number of rows of the dimension information table 1000 (FIG. 10) of the multidimensional database 2306 is set as the number of dimensions. At this time, the number of dimensions of the multidimensional data is five.

At step 2702, as many coordinate axes as the number of dimensions are displayed on the screen of the display device 2203. Dimensions and coordinate axes are associated with each other in a one-to-one correspondence.

In the above described example of the narrowing down processing, coordinate axes corresponding to the time dimension, commodity dimension, selling agency dimension, region dimension, and customer dimension are displayed as shown in FIG. 1.

At step 2703, the top row of the dimension information table of the multidimensional database 2306 is set to a processing subject row.

In the above described example of the narrowing down processing, the row of the time dimension which is the first row of the dimension information table 1000 is set to a processing subject row. At step 2704, the number of aggregation levels is acquired from the processing subject row of the dimension information table 1000. For example, if the processing subject row is the second row, then four is acquired as the number of aggregation levels.

At step 2705, as many graduations as the number of aggregation levels acquired at the step 2704 are displayed on corresponding coordinate axes.

In the above described example of the narrowing down processing, five graduations are displayed in the case of the time dimension, and four graduations are displayed in the case of the commodity dimension as shown in FIG. 1. Five graduations are displayed in the case of the selling agency dimension, four graduations are displayed in the case of the region dimension, and three graduations are displayed in the case of the customer dimension.

At step 2706, aggregation levels are associated with graduations. At this time, as regards all coordinate axes, the arrangement order of graduations are unified to either the ascending order or descending order of the corresponding aggregation levels.

In the above described example of the narrowing down processing, aggregation levels of respective dimensions are acquired by referring to the hierarchy information table 1100 (FIG. 11), rearranged in the descending level order, and displayed so as to be associated with graduations in order, beginning from a graduation located near the center. For example, in the case of time dimension, "year", "quarter of the year", "month", "week", and "day" are displayed in the cited order, beginning from the center, as shown in FIG. 1.

At step 2707, it is determined whether the next row of the dimension information table is present. If the next row is present, the processing proceeds to step 2708. If the next row is not present, the processing proceeds to step 2709 and the processing is finished.

In the above described example of the narrowing down processing, the processing proceeds to the step 2708, provided that the processing subject row is in the range of the first to fourth row of the dimension information table 1000. If the processing subject row is the fifth row, the processing proceeds to the step 2709.

At the step 2708, a row next to the processing subject row of the dimension information table is set to the processing subject row.

In the above described example of the narrowing down processing, it is assumed that the row of the commodity dimension located in the second row is the processing subject row. In this case, the row of the selling agency located in the third row is set to the processing subject row.

By executing the steps heretofore described, coordinate axes are displayed on the display device 2203. In the above described example of the narrowing down processing, dimensions are associated with coordinate axes in a one-to-one correspondence and aggregation levels are associated with graduations of coordinate axes in a one-to-one correspondence, as shown in FIG. 1. Graduations of each coordinate axis are arranged from the center outward, in the descending order of corresponding aggregation levels.

Figure 28:
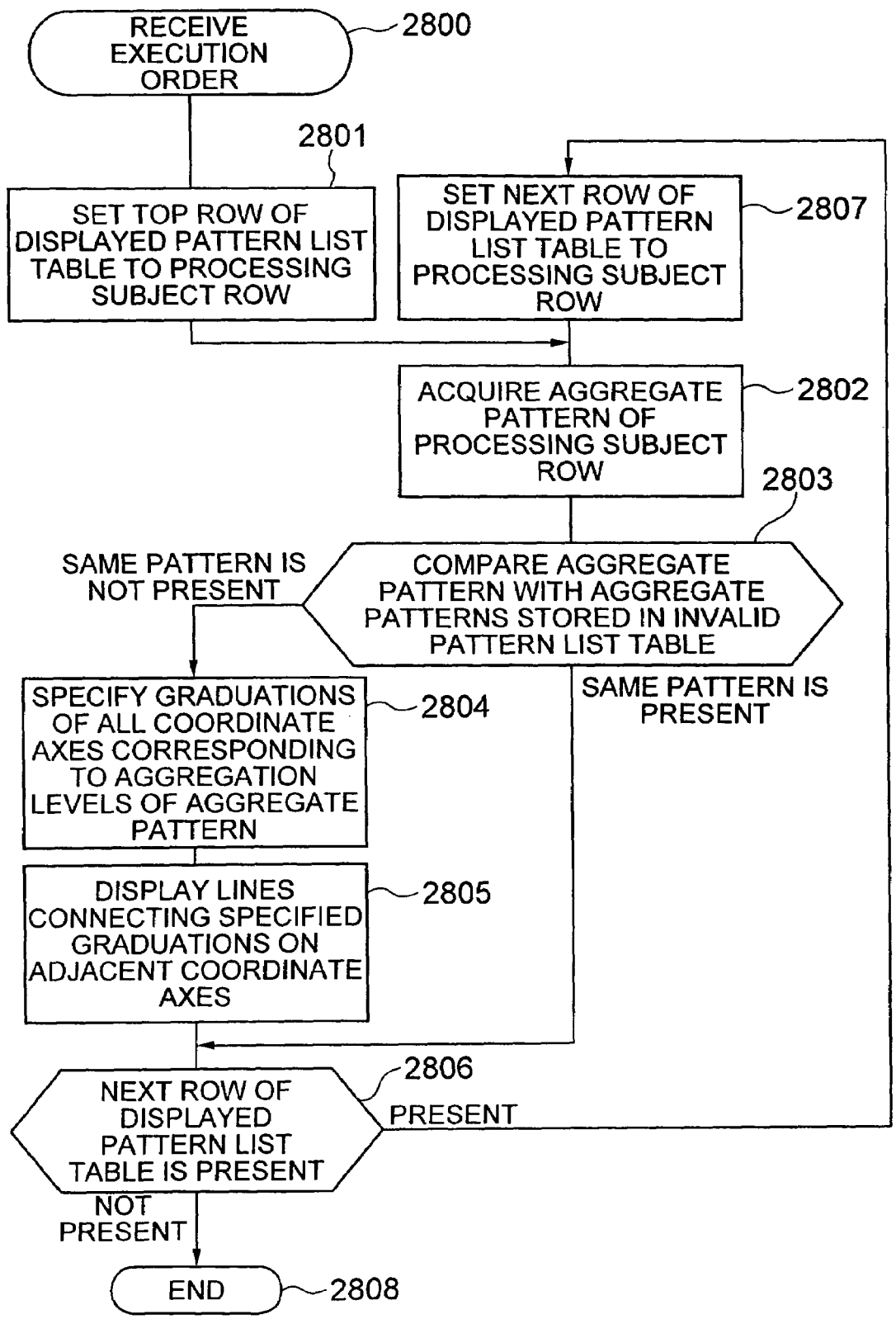
FIG. 28 is a flow chart of an aggregate pattern display program.

FIG. 28 is a flow chart of the aggregate pattern display program 2408. In the above described example of narrowing down processing, the processing of displaying aggregate patterns having a response time for aggregate query of at least one minute corresponds thereto.

At step 2800, an execution order is received. Execution is ordered by the display instruction processing program 2405.

At step 2801, the top row of the displayed pattern list table 2301 is set to the processing subject row.

In the above described example of the narrowing down processing, a first row of the displayed pattern list table 1300 (FIG. 13) is set to the processing subject row.

At step 2802, an aggregate pattern is acquired from the processing subject row of the displayed pattern list table 2301.

In the above described example of the narrowing down processing, an aggregate pattern is acquired from the displayed pattern list table 1300. For example, if the processing subject row is a first row, then there is acquired an aggregate pattern having "month" as an aggregation level of the time dimension, "maker" as an aggregation of the commodity dimension, "section" as an aggregation of the selling agency dimension, "urban or rural prefecture" as an aggregation of the region dimension, and "type of industry" as an aggregation of the customer dimension.

At step 2803, it is determined whether the aggregate pattern acquired at the step 1802 is registered in the invalid pattern list table 2304. If the acquired aggregate pattern is not previously registered in the invalid pattern list table, then the processing proceeds to step 2804. If the acquired aggregate pattern is previously registered in the invalid pattern list table, then the processing proceeds to step 2806.

In the above described example of the narrowing down processing, the processing proceeds to the step 2806, provided that the acquired aggregate pattern is an aggregate pattern previously registered in the invalid pattern list table 1600 (FIG. 16). Otherwise, the processing proceeds to the step 2804.

At the step 2804, graduations corresponding to aggregation levels of respective dimensions of the aggregate pattern acquired at the step 2802 are specified for each of corresponding coordinate axes.

In the above described example of the narrowing down processing, it is assumed that the processing subject row is a first row. In this case, as regards aggregation levels registered in respective columns of the first row of the displayed pattern list table 1300, graduations of respective coordinate axes of the graph shown in FIG. 1 are specified. In the time dimension, a graduation "month" is specified.

Among the specified graduations, a line connecting graduations on adjacent coordinate axes is displayed at step 2805. At this time, colors and shapes of displayed lines may be determined according to characteristics of the displayed aggregate patterns.

In the above described example of the narrowing down processing, it is assumed that the processing subject row is a first row. In this case, a pentagon having a graduation "month" of the time dimension axis, a graduation "classification" of the commodity axis, a graduation "section" of the selling agency axis, a graduation "urban or rural prefecture" of the region axis, and a graduation "type of industry" of the customer axis as vertexes is displayed as represented by the pentagon 1701 of FIG. 17.

Furthermore, as shown in FIG. 7, the shape of a line can be changed according to the total data size of the aggregate pattern.

At step 2806, it is determined whether the next row of the displayed pattern list table 2301 is present. If the next row is present, then the processing proceeds to step 2807. If the next row is not present, then the processing proceeds to step 2808, and the processing is finished.

At the step 2807, the row next to the processing subject row of the displayed pattern list table is set as the processing subject row.

By executing the steps heretofore described, aggregate patterns satisfying a condition specified by the user are displayed on the display device 2203. In the above described example of the narrowing down processing, the aggregate pattern 1701 and 1702 are displayed as shown in FIG. 17. An aggregate pattern shown in FIG. 17 has "month" as the aggregation level of the time dimension, "maker" as the aggregation level of the commodity dimension, "section" as the aggregation of the selling agency dimension, "urban or rural prefecture" as the aggregation level of the region dimension, and "type of industry" as the aggregation level of the customer dimension. Another aggregate pattern shown in FIG. 17 has "month" as the aggregation level of the time dimension, "classification" as the aggregation level of the commodity dimension, "branch" as the aggregation of the selling agency dimension, "urban or rural prefecture" as the aggregation level of the region dimension, and "type of industry" as the aggregation level of the customer dimension.

Figure 29:
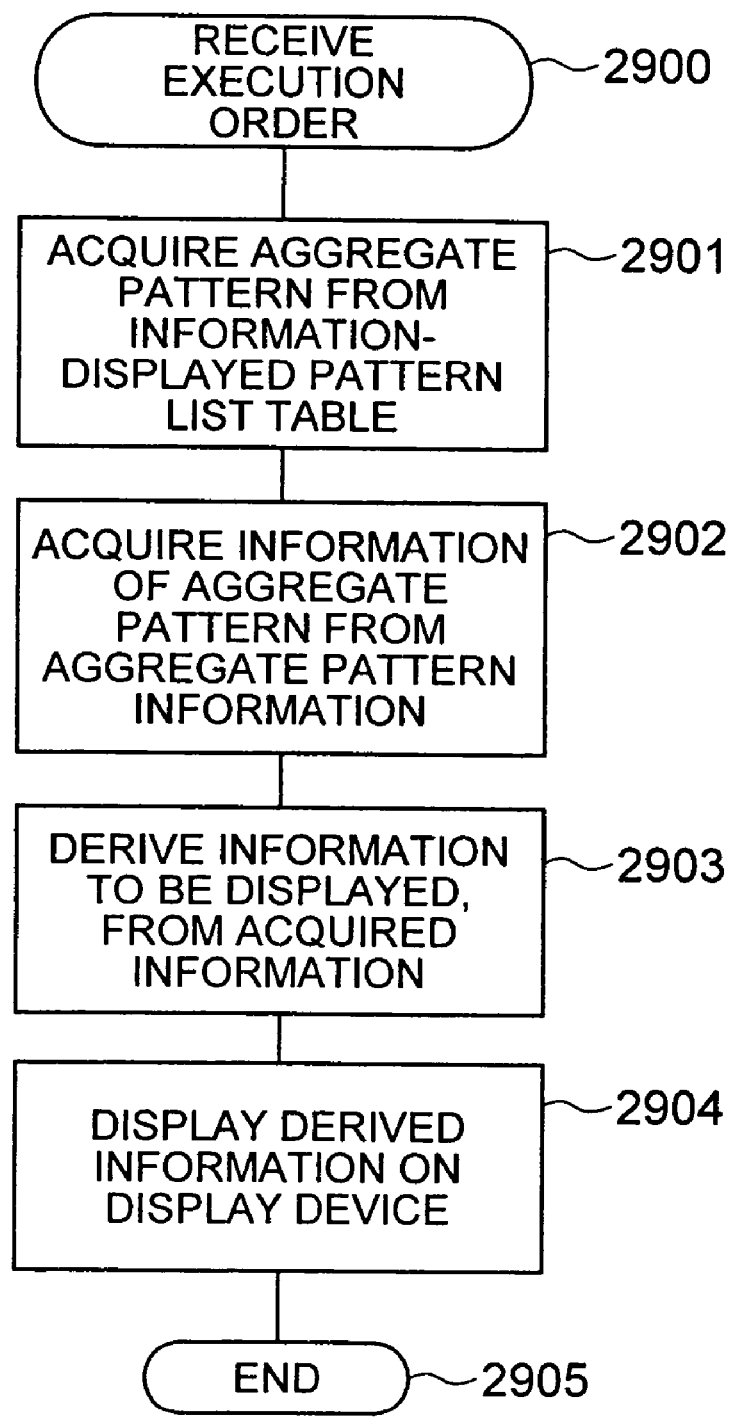
FIG. 29 is a flow chart of an information display program.

FIG. 29 is a flow chart of the information display program 2409. In the above described example of the narrowing down processing, the processing of displaying the total data size of the aggregate pattern 1701 (FIG. 17) corresponds thereto.

At step 2900, an execution order is received. Execution is ordered by the display instruction processing program 2405.

At step 2901, an aggregate pattern which is the processing subject is acquired from the information-displayed pattern list table 2302.

In the above described example of the narrowing down processing, an aggregate pattern is acquired from a row of the information-displayed pattern list table 1400 (FIG. 14). The previously registered aggregate pattern is the aggregate pattern 1701 having "month" as the aggregation level of the time dimension, "maker" as the aggregation level of the commodity dimension, "section" as the aggregation of the selling agency dimension, "urban or rural prefecture" as the aggregation level of the region dimension, and "type of industry" as the aggregation level of the customer dimension.

From out of the aggregate pattern information table 2305, a row having aggregation levels of respective columns which coincide with aggregation levels of the aggregate pattern acquired at the step 2901 is found at step 2902. From the found row, aggregate pattern information is acquired.

In the above described example of the narrowing down processing, aggregate pattern information is acquired from the row 501 of the aggregate pattern information table 500 having "month" in the first column, "maker" in the second column, "section" in the third column, "urban or rural prefecture" in the fourth column, and "type of industry" in the fifth column.

At step 2903, information to be displayed on the display device 2203 is derived from the aggregate pattern information acquired at the step 2902.

In the above described example of the narrowing down processing, the instruction is the display instruction of the total data size. From the row 501, therefore, the value of the seventh column corresponding to the total data size is acquired.

In the case of a display instruction of information which is not previously registered in the aggregate pattern information table 2305, information to be displayed is derived from a value registered in the aggregate pattern information table 2305, by calculation. For example, in the case of a display instruction of data load time, the data load time is calculated from the total data size registered in the aggregate pattern information table 500.

At step 2904, information derived at the step 2903 is displayed on the display device 2203.

In the above described example of the narrowing down processing, the aggregate pattern 1701 and the total data size are displayed on the display device 2203 as shown in FIG. 6.

By executing the steps heretofore described, information of an aggregate pattern specified by the user is displayed on the display device 2203. In the above described example of the narrowing down processing, a pentagon representing the aggregate pattern 1701 and the total data size are displayed as shown in FIG. 6.

Figure 30:
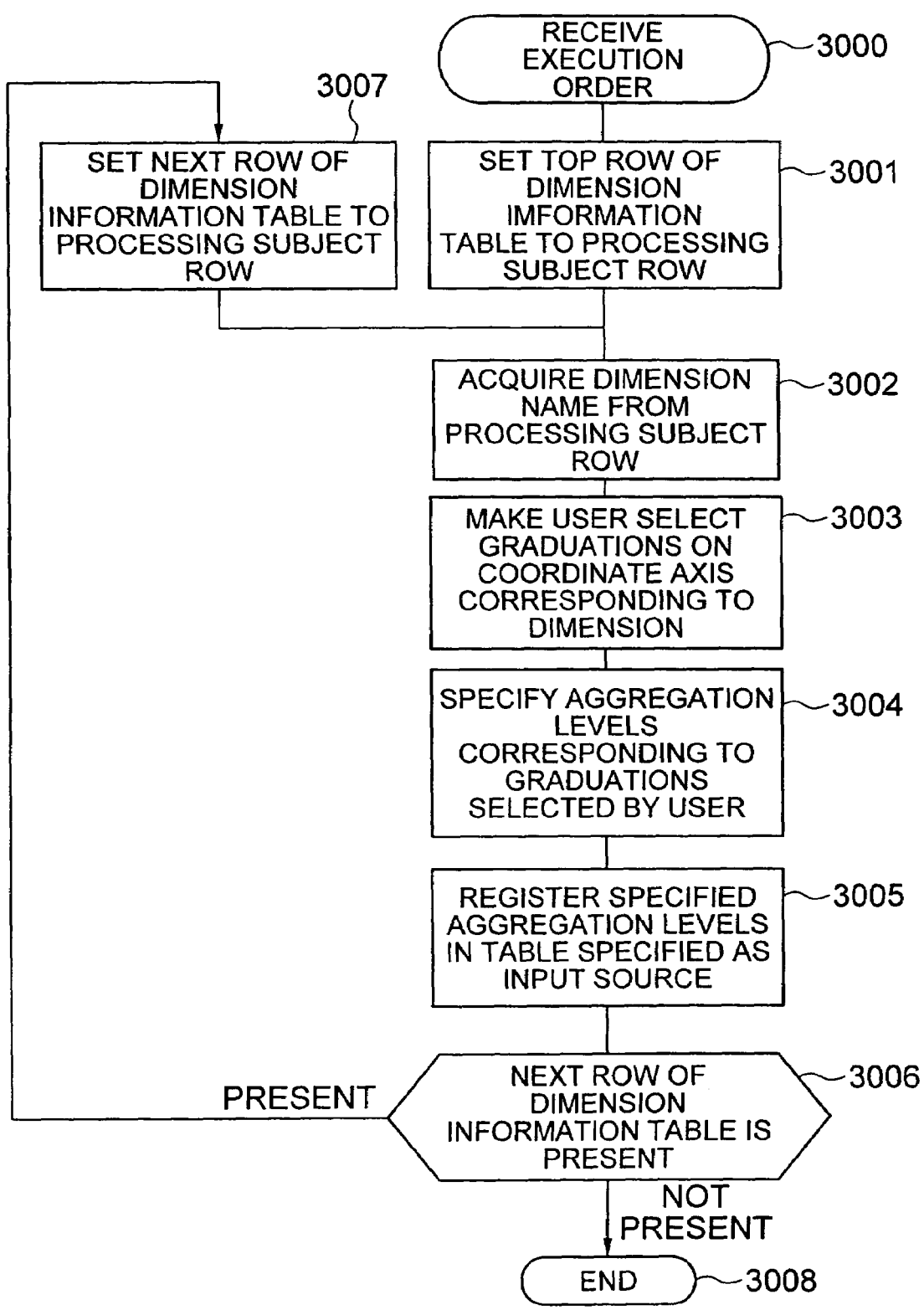
FIG. 30 is a flow chart of an aggregate pattern input program.

FIG. 30 is a flow chart of the aggregate pattern input program 2410. In the above described example of the narrowing down processing, processing of inputting the aggregate pattern 1901 (FIG. 19) corresponds thereto.

At step 3000, an execution order is received. Execution is ordered by the display instruction processing program 2405 or the input instruction processing program 2406.

At step 3001, the top row of the dimension information table of the multidimensional database 2306 is set to the processing subject row.

In the above described example of the narrowing down processing, the row of the time dimension which is the first row of the dimension information table 1000 (FIG. 10) is set to the processing subject row.

At step 3002, the dimension name is acquired from the processing subject row of the dimension information table.

In the above described example of the narrowing down processing, the dimension name is acquired from the dimension information table 1000. For example, in the case where the processing subject row is the first row, the dimension name "time dimension" is acquired.

At step 3003, the user is urged to select a graduation on a coordinate axis corresponding to the dimension acquired at the step 3002. The coordinate axis is displayed on the display device 2203. The user inputs a graduation position selected on the screen of the display device 2203 by using the input device 2204.

Figure 31:
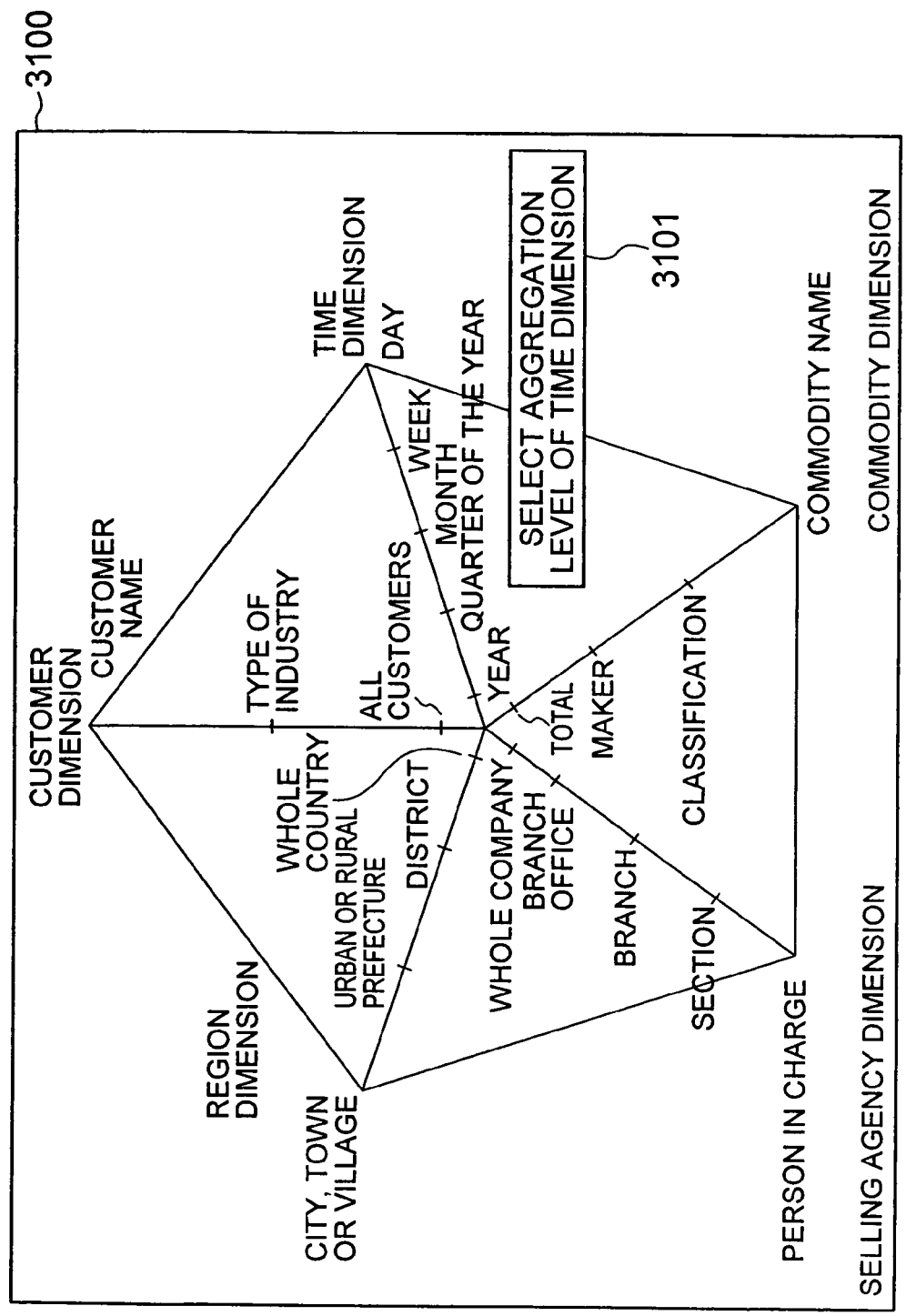
FIG. 31 is a diagram showing a display example of a screen for requesting input of an aggregate pattern.

In the above described example of the narrowing down processing, it is assumed that the processing subject row is the first row. In this case, a message 3101 requesting the user to select a graduation on the time dimension axis on a graph 3100 is displayed as shown in FIG. 31. The user selects a graduation corresponding to the "month level" located in the third level from the center.

At step 3004, an aggregation level corresponding to the graduation selected by the user is found from the information inputted by the input device 2204.

In the above described example of the narrowing down processing, it is assumed that the processing subject row is the first row. In this case, the user has selected the third graduation from the center. Therefore, the "month level" which is the third aggregation level from the lowest level is set as the aggregation level selected by the user.

At step 3005, the aggregation level found at the step 3004 is registered in a table specified as the input source, as a component of the aggregate pattern.

In the above described example of the narrowing down processing, it is assumed that the dimension is the time dimension. In this case, "month level" which is the aggregation level found at the step 3004 is registered in the first column of the pre-aggregate cube list table 1500 specified as the input source.

At step 3006, it is determined whether the next row of the dimension information table is present. If the next row is present, the processing proceeds to step 3007. If the next row is not present, the processing proceeds to step 3008 and the processing is finished.

In the above described example of the narrowing down processing, the processing proceeds to the step 3007, provided that the processing subject row is in the range of the first to fourth row of the dimension information table 1000. If the processing subject row is the fifth row, the processing proceeds to the step 3008.

At the step 3007, a row next to the processing subject row of the dimension information table is set to the processing subject row.

In the above described example of the narrowing down processing, it is assumed that the row of the commodity dimension located in the first row is the processing subject row. In this case, the second row is set to the processing subject row.

By executing the steps heretofore described, an aggregate pattern selected by the user is inputted. In the above described example of the narrowing down processing, an aggregate pattern having "month" as the aggregation level of the time dimension, "classification" as the aggregation level of the commodity dimension, "section" as the aggregation level of the selling agency dimension, "urban or rural prefecture" as the aggregation level of the region dimension, and "type of industry" as the aggregation level of the customer dimension is inputted to the pre-aggregate cube list table 1500.

Heretofore, the present invention has been described concretely on the basis of the embodiments. The present invention is not limited to the embodiments. As a matter of course, various modifications are possible without departing from the spirit of the invention.

According to the present invention, there is brought about an effect that the work of narrowing down the pre-aggregate cubes is facilitated by visualizing the relations among a plurality of aggregate patterns.

What is claimed is:

1. In a database management system for storing data of a plurality of dimensions and processing aggregation requests concerning said data, a data display method for displaying aggregate patterns, said data display method comprising the steps of:

displaying coordinate axes respectively assigned to said plurality of dimensions;

displaying a scale on each axis, the scale corresponding to aggregation levels of the assigned dimension, the scale being arranged either in an ascending order or in descending order of the aggregation levels;

determining one aggregation level on each axis according to the aggregation requests to be processed; and connecting the determined aggregation levels on the respective axes with lines to display the aggregate pattern as a polygon.

2. A data display method according to claim 1, comprising the steps of arranging graduations for displaying aggregation levels of each coordinate axis, in positions determined based on number of members belonging to each aggregation level.

3. A data display method according to claim 1, comprising the steps of:

providing an aggregate information storage section for storing information concerning respective aggregate patterns;

responding to user's selection of an aggregate pattern displayed on a display screen, and thereby acquiring information concerning the aggregate pattern selected by the user, from said aggregate information storage section; and displaying the acquired information or information derived from the acquired information, on said display screen.

4. A data display method according to claim 1, comprising the steps of:

providing an aggregate information storage section for storing information concerning respective aggregate patterns;

acquiring information concerning aggregate patterns displayed on said display screen, from said aggregate information storage section; and altering a color or shape of a line of a figure representing a multidimensional aggregate pattern, according to the acquired information or information derived from the acquired information.

5. A data display method according to claim 1, comprising the steps of:
responding to user's selection of an aggregate pattern displayed on a display screen, and thereby deriving data serving as a source of aggregation in aggregation processing of the aggregate pattern selected by the user;
specifying a graduation corresponding to an aggregation level of the derived data, for each coordinate axis corresponding to each dimension; and
displaying lines connecting graduations on adjacent coordinate axes.

6. A data display method according to claim 1, comprising the steps of:
providing an aggregate information storage section for storing information concerning respective aggregate patterns;
providing an input device for inputting a display condition;
selecting patterns meeting a condition specified by a user, from among all aggregate candidates; and
displaying all of the selected aggregate patterns.

7. A data display method according to claim 6, comprising the steps of:
excluding aggregate patterns specified by the user to be beside processing subjects, from aggregate candidates.

8. In a database management system for storing data identified by combinations of members of a plurality of dimensions and for processing aggregation requests concerning said data, a data display method for displaying aggregate patterns, said aggregate patterns being combinations of aggregation levels stipulated based on a hierarchy structure of members of respective dimensions, said data display method comprising the steps of:
displaying coordinate axes respectively assigned to said plurality of dimensions;
displaying a scale on each axis, the scale corresponding to aggregation levels of the assigned dimension, the scale being arranged either in an ascending or in descending order of the aggregation levels;
determining one aggregation level on each axis according to the aggregation requests to be processed; and
connecting the determined aggregation levels on the respective axes with lines to display the aggregate pattern as a polygon.

9. A database management system for storing data of a plurality of dimensions and processing aggregation requests concerning said data, said database management system comprising:
means for displaying coordinate axes respectively assigned to said plurality of dimensions;
means for displaying a scale on each axis, the scale corresponding to the aggregation levels of the assigned dimension, the scale being arranged either in an ascending order or in descending order of the aggregation levels;
means for determining one aggregation level on each axis according to the aggregation requests to be processed; and
means for connecting the determined aggregation levels on the respective axes with lines to display the aggregate pattern as a polygon.

10. In a database management system for storing data of a plurality of dimensions and processing aggregation requests concerning said data, a recording medium storing a data display program for displaying aggregate patterns, said data display program when executed causing the database management system to perform:
displaying coordinate axes respectively assigned to said plurality of dimensions;
displaying a scale on each axis, the scale corresponding to aggregation levels of the assigned dimension, the scale being arranged either in an ascending order or in descending order of the aggregation levels;
determining one aggregation level on each axis according to the aggregation requests to be processed; and
connecting the determined aggregation levels on the respective axes with lines to display the aggregate pattern as a polygon.

11. In a database management system for storing data of a plurality of dimensions and processing aggregation results concerning said data, a data display program for displaying aggregate patterns, said data display program when executed causing the database management system to perform:
displaying coordinate axes respectively assigned to said plurality of dimensions;
displaying a scale on each axis, the scale corresponding to the aggregation levels of the assigned dimension, the scale being arranged either in an ascending order or in descending order of the aggregation levels;
determining one aggregation level on each axis according to the aggregation requests to be processed; and
connecting the determined aggregation levels on the respective axes with lines to display the aggregate pattern as a polygon.

12. A data display method used for comparing costs for aggregating multidimensional data in a multidimensional database system, comprising the steps of:
displaying coordinate axes representing all dimensions of the multidimensional data from a center point in a radial manner;
displaying a scale on each coordinate axis indicating aggregation levels of the dimension;
displaying a first aggregation pattern which combines first values of aggregation levels of respective dimensions by connecting the scales indicating the first values of aggregation levels on the respective coordinate axes with a first line; and
displaying a second aggregation pattern which combines second values of aggregation levels of respective dimensions by connecting the scales indicating the second values of aggregation levels on the respective coordinate axes with a second line.

* * * * *